US008446609B2

(12) United States Patent
Moriwaki

(10) Patent No.: US 8,446,609 B2
(45) Date of Patent: May 21, 2013

(54) IMAGE FORMATION SYSTEM AND APPARATUS CAPABLE OF QUEUING AND HOLDING PRINT JOBS AND METHOD FOR PROCESSING CAPABLE OF QUEUING PRINT JOBS AND PROVIDING NOTIFICATIONS

(75) Inventor: Kagumi Moriwaki, Kawanishi (JP)

(73) Assignee: Konica Minolta Holdings, Inc., Chiyoda-Ku, Tokyo (JP)

( * ) Notice: Subject to any disclaimer, the term of this patent is extended or adjusted under 35 U.S.C. 154(b) by 648 days.

(21) Appl. No.: 12/703,316

(22) Filed: Feb. 10, 2010

(65) Prior Publication Data
US 2010/0214602 A1 Aug. 26, 2010

(30) Foreign Application Priority Data
Feb. 24, 2009 (JP) .................................. 2009-041006

(51) Int. Cl.
G06K 15/00 (2006.01)
G06K 15/02 (2006.01)
G06F 3/12 (2006.01)
G03G 15/00 (2006.01)

(52) U.S. Cl.
USPC ....... 358/1.14; 358/1.15; 358/1.12; 358/1.13; 358/1.11; 399/8; 399/23; 399/24; 399/82

(58) Field of Classification Search
None
See application file for complete search history.

(56) References Cited

U.S. PATENT DOCUMENTS

| 6,585,344 | B2* | 7/2003 | Kolodziej | 347/19 |
| 7,009,719 | B2* | 3/2006 | Willis et al. | 358/1.1 |
| 7,853,160 | B2* | 12/2010 | Koitabashi | 399/24 |
| 7,916,316 | B2* | 3/2011 | Saikawa | 358/1.14 |
| 8,149,444 | B2* | 4/2012 | Odagiri | 358/1.15 |
| 2005/0276618 | A1* | 12/2005 | Clement et al. | 399/24 |
| 2006/0227368 | A1* | 10/2006 | Hong | 358/1.15 |
| 2007/0071462 | A1* | 3/2007 | Koitabashi | 399/23 |
| 2008/0075491 | A1* | 3/2008 | Tao | 399/45 |
| 2010/0245899 | A1* | 9/2010 | Hirama | 358/1.15 |

FOREIGN PATENT DOCUMENTS
JP 2007-324650 A 12/2007

* cited by examiner

Primary Examiner — Hilina S Kassa
(74) Attorney, Agent, or Firm — Buchanan Ingersoll & Rooney PC

(57) ABSTRACT

An image formation apparatus obtains an amount of sheets remaining in its accommodation unit and from that amount determines whether a print job of interest can successfully be processed for printing. If so, then the print job of interest is processed for printing. If not, a print notification dialog box is output to provide notification that the print job cannot successfully be processed for printing and that it is necessary to resupply sheets required to process the print job for printing.

10 Claims, 15 Drawing Sheets

204a

| | Job ID 281 | REQUEST TIME 282 | USER ID 283 | TYPE OF PRINTING 284 | REQUESTER IP ADDRESS 285 | COLOR INFORMATION 286 | NO. OF PAGES 287 | JOB DATA 288 |
|---|---|---|---|---|---|---|---|---|
| ADDED | 105 | 2008/9/1 11:20 | 10 | IMMEDIATE | 10.20.20.105 | COLOR | 5 | 200809011120.rst |
| | 104 | 2008/9/1 11:10 | 1 | QUEUE & HOLD | 10.20.20.98 | COLOR | 5 | 200809011110.rst |
| | 103 | 2008/9/1 11:00 | 2 | QUEUE & HOLD | 10.20.20.93 | BLACK & WHITE | 10 | 200809011100.rst |
| | 102 | 2008/9/1 10:40 | 1 | QUEUE & HOLD | 10.20.20.98 | COLOR | 3 | 200809011040.rst |
| | 101 | 2008/9/1 10:30 | 2 | QUEUE & HOLD | 10.20.20.93 | BLACK & WHITE | 5 | 200809011030.rst |
| | 100 | 2008/9/1 10:00 | 3 | QUEUE & HOLD | 10.20.20.90 | COLOR | 50 | 200809011000.rst |

ADDED:

| Job ID | REQUEST TIME | USER ID | TYPE OF PRINTING | REQUESTER IP ADDRESS | COLOR INFORMATION | NO. OF PAGES | JOB DATA |
|---|---|---|---|---|---|---|---|
| 106 | 2008/9/1 11:22 | 11 | IMMEDIATE | 10.20.20.109 | COLOR | 3 | 200809011122.rst |
| 105 | 2008/9/1 11:20 | 10 | IMMEDIATE | 10.20.20.105 | COLOR | 5 | 200809011120.rst |
| 104 | 2008/9/1 11:10 | 1 | QUEUE & HOLD | 10.20.20.98 | COLOR | 5 | 200809011110.rst |
| 103 | 2008/9/1 11:00 | 2 | QUEUE & HOLD | 10.20.20.93 | BLACK & WHITE | 10 | 200809011100.rst |
| 102 | 2008/9/1 10:40 | 1 | QUEUE & HOLD | 10.20.20.98 | COLOR | 3 | 200809011040.rst |
| 101 | 2008/9/1 10:30 | 2 | QUEUE & HOLD | 10.20.20.93 | BLACK & WHITE | 5 | 200809011030.rst |
| 100 | 2008/9/1 10:00 | 3 | QUEUE & HOLD | 10.20.20.90 | COLOR | 50 | 200809011000.rst |

RE-PRIORITIZED:

| Job ID | REQUEST TIME | USER ID | TYPE OF PRINTING | REQUESTER IP ADDRESS | COLOR INFORMATION | NO. OF PAGES | JOB DATA |
|---|---|---|---|---|---|---|---|
| 105 | 2008/9/1 11:20 | 10 | IMMEDIATE | 10.20.20.105 | COLOR | 5 | 200809011120.rst |
| 106 | 2008/9/1 11:22 | 11 | IMMEDIATE | 10.20.20.109 | COLOR | 3 | 200809011122.rst |
| 104 | 2008/9/1 11:10 | 1 | QUEUE & HOLD | 10.20.20.98 | COLOR | 5 | 200809011110.rst |
| 103 | 2008/9/1 11:00 | 2 | QUEUE & HOLD | 10.20.20.93 | BLACK & WHITE | 10 | 200809011100.rst |
| 102 | 2008/9/1 10:40 | 1 | QUEUE & HOLD | 10.20.20.98 | COLOR | 3 | 200809011040.rst |
| 101 | 2008/9/1 10:30 | 2 | QUEUE & HOLD | 10.20.20.93 | BLACK & WHITE | 5 | 200809011030.rst |
| 100 | 2008/9/1 10:00 | 3 | QUEUE & HOLD | 10.20.20.90 | COLOR | 50 | 200809011000.rst |

281  282  283  284  285  286  287  288

IMAGE FORMATION SYSTEM AND APPARATUS CAPABLE OF QUEUING AND HOLDING PRINT JOBS AND METHOD FOR PROCESSING CAPABLE OF QUEUING PRINT JOBS AND PROVIDING NOTIFICATIONS

This application is based on Japanese Patent Application No. 2009-041006 filed with the Japan Patent Office on Feb. 24, 2009, the entire content of which is hereby incorporated by reference.

BACKGROUND OF THE INVENTION

1. Field of the Invention

The present invention relates to image formation systems capable of switching between a mode requesting immediately executing a print job independently of another print job and a mode requesting that executing a print job be held back until a predetermined condition is satisfied, image formation apparatuses for the image formation systems, and methods for processing performed in the image formation apparatuses.

2. Description of the Related Art

Conventionally, various approaches have been made to enable various apparatuses to achieve reduced power consumption. Such approaches have also been continued for image formation apparatuses such as printers, copiers and the like.

One such approach is disclosed in Japanese Laid-Open Patent Publication No. 2007-324650, More specifically, the publication discloses that in a sleep mode when a print job is received from an external device the job is temporarily stored as a held job and when a predetermined execution starting condition is established a necessary functional block is switched from a non-conducted state to a conducted state to execute the held job.

Another such approach proposes causing an image formation apparatus to perform an image formation process (hereinafter also referred to as a "printing process" or "processing . . . for printing") intensively to perform a warm up operation less frequently and also achieve an increased sleep time. This allows the image formation apparatus as a whole to achieve reduced power consumption. More specifically, in warming up, a fuser and fixer is increased in temperature, a transfer medium is electrically charged and other various types of initial operations are performed. This requires a relatively large amount of electric power, and less frequently performing a warm up operation can contribute to reduced power consumption. Furthermore, the printing process intensively performed allows a print engine to have its various units without electric power supplied thereto, i.e., a sleep state, to be held for an increased period of time.

The printing process is intensively performed, as described above, in one manner, as proposed as follows: An image formation apparatus receives a print job, for which a mode requesting that the print job be immediately processed, independently of another print job, for printing, or a mode requesting that processing the print job for printing be held back until a predetermined condition is satisfied, is set. Hereinafter, the former mode will also be referred to as an "immediate print mode" and the latter mode will also be referred to as a "queue and hold mode".

More specifically, a user requesting some printing process selects the immediate print mode or the queue and hold mode in generating a print job. The image formation apparatus receives such print jobs, and for those thereof with the immediate print mode set, the image formation apparatus starts the printing process in the order in which they are received, whereas those thereof with the queue and hold mode set are queued and held in a certain memory area. Subsequently when the predetermined condition with regard to the queued and held print jobs is satisfied (typically, when the queued and held print jobs reach a predetermined number of sheets to be printed or larger), the image formation apparatus starts to process the queued and held print jobs for printing. Note that in view of reducing power consumption, it is most efficient that processing print jobs with the immediate print mode set for printing is followed by processing print jobs with the queue and hold mode set for printing.

Such an image formation apparatus that can set the immediate print mode and the queue and hold mode will serve both users who desire to quickly receive their printed matters (i.e., users who designate the immediate print mode) and users who may receive their printed matters anytime (i.e., users who designate the queue and hold mode).

A typical image formation apparatus performing a printing process has sheets therefor accommodated in a sheet feeding cassette or the like and for example when the cassette runs out of sheets it is often the case that the image formation apparatus notifies for example a user who is an owner of a currently executed print job that the cassette runs out of sheets.

Simply applying such a conventional notification scheme to the image formation apparatus that can set the immediate print mode and the queue and hold mode, as described above, however, does not provide sufficient convenience for its users. More specifically, for example when the image formation apparatus runs out of sheets while executing a print job with the queue and hold mode designated, and notifies a user who is the owner of that print job that the apparatus runs out of sheets, the apparatus may not immediately be resupplied with sheets, since it is often the case that the user thinks that he/she may receive his/her printed matter anytime. The image formation apparatus will thus be left with no sheets.

With the image formation apparatus left with no sheets, a user who designates the immediate print mode and desires to quickly receive his/her printed matter may not be able to do so.

SUMMARY OF THE INVENTION

The present invention has been made to overcome such disadvantage, and it contemplates an image formation system capable of setting an immediate print mode or a queue and hold mode to achieve reduced power consumption and also capable of ensuring that a print job of a user who desires to quickly receive a printed matter is immediately processed for printing, an image formation apparatus directed to the image formation system, and a method for processing in the image formation apparatus.

The present invention in one aspect provides an image formation system including an image formation apparatus. The image formation system includes a receiving unit for receiving a print job, a queuing unit, a first determination unit, a second determination unit, a notification unit, and an execution unit. The receiving unit for receiving a print job receives a print job generated in accordance with an operation from a user. The print job is generated with one of first and second modes set. The first mode is for requesting immediately forming an image independently of another print job, and the second mode is for requesting that forming an image be held back until a predetermined condition is satisfied. The queuing unit queues the received print job. The first determination unit determines what mode is set for the queued print job. The second determination unit determines for the queued print job with the first mode set whether the print job can successfully be processed to form an image based on a status of a consumable item required to form the image. The notification unit notifies, in response to a decision made by the second determination unit that the queued print job cannot successfully be processed to form the image, an information processing device as a source of the queued print job with the first mode set that (a) the queued print job cannot successfully be processed to form the image and (b) it is necessary to resupply/replace the consumable item required to form the image. The execution unit executes processing the queued print job to form the image when it is determined that the queued print job can successfully be processed to form the image.

Preferably, the image formation system further includes an identification unit for identifying a user who has resupplied/replaced the consumable item the information processing device has been notified of. The queuing unit is configured to prioritize a plurality of print jobs and accordingly queue the print jobs. The first determination unit is configured to earlier identify what mode is set for the queued print job in the queuing unit that is prioritized to have a higher place. The queuing unit is further configured such that after the notification unit has issued notification the queuing unit re-prioritizes the print job that is associated with the user who has resupplied/replaced the consumable item to have a higher place.

The present invention in another aspect provides an image formation apparatus including a queuing unit, a first determination unit, a second determination unit, a notification unit, and an execution unit. The queuing unit receives and queues a print job with one of first and second modes set. The first mode is for requesting immediately forming an image independently of another print job, and the second mode is for requesting that forming an image be held back until a predetermined condition is satisfied. The first determination unit determines what mode is set for the queued print job. The second determination unit determines for the queued print job with the first mode set whether the print job can successfully be processed to form an image based on a status of a consumable item required to form the image. The notification unit provides, in response to a decision made by the second determination unit that the queued print job cannot successfully be processed to form the image, notification that (a) the queued print job cannot successfully be processed to form the image and (b) it is necessary to resupply/replace the consumable item required to form the image. The execution unit executes processing the queued print job to form the image when it is determined that the queued print job can successfully be processed to form the image.

Preferably, the notification unit is configured to provide the notification to a user associated with the queued print job.

Preferably, the notification unit is configured to provide in addition to the notification a user interface for receiving an instruction to cancel the queued print job, and the queuing unit is configured such that when the instruction to cancel the queued print job is provided on the user interface the queuing unit cancels a designated print job.

Preferably, the notification unit is configured such that after the notification has been issued when the second determination unit changes its previous decision the notification unit updates what has previously been informed by the notification.

Preferably, the queuing unit is configured to prioritize a plurality of print jobs and accordingly queue the print jobs. The first determination unit is configured to earlier identify what mode is set for the queued print job in the queuing unit that is prioritized to have a higher place. The image formation apparatus further includes an identification unit for identifying a user who has resupplied/replaced the consumable item indicated in the notification. The queuing unit is further configured such that after the notification unit has issued the notification the queuing unit re-prioritizes the print job that is associated with the user who has resupplied/replaced the consumable item to have a higher place.

Preferably, the image formation apparatus further includes an accommodation unit for accommodating sheets on which the image is formed, and a unit for obtaining how many sheets are accommodated in the accommodation unit. The second determination unit is configured to compare how many sheets are accommodated in the accommodation unit with how many sheets are required to form the image for the queued print job, and therefrom determine whether the queued print job can successfully be processed to form the image.

The present invention in still another aspect provides a method performed in an image formation apparatus for processing. The method includes the steps of: receiving and queuing a print job with one of first and second modes set, the first mode being for requesting immediately forming an image independently of another print job, the second mode being for requesting that forming an image be held back until a predetermined condition is satisfied; determining what mode is set for the queued print job; determining for the queued print job with the first mode set whether the print job can successfully be processed to form an image based on a status of a consumable item required to form the image; when it is determined that the queued print job cannot successfully be processed to form the image, notifying a user who has transmitted the print job with the first mode set that (a) the queued print job cannot successfully be processed to form the image and (b) it is necessary to resupply/replace the consumable item required to form the image; and when it is determined that the queued print job can successfully be processed to form the image, executing processing the queued print job to form the image.

The present invention thus ensures that an image formation apparatus that can set an immediate print mode and a queue and hold mode can immediately perform a printing process for a print job of a user who desires to quickly receive a printed matter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A and 12B show another example of the print job queue list of the image formation apparatus in the embodiment of the present invention.

DESCRIPTION OF THE PREFERRED EMBODIMENTS

Hereinafter the present invention in an embodiment will be described with reference to the drawings more specifically. In the figures, identical or corresponding components are identically denoted and will not be described repeatedly.

Configuration of Image Formation System

Figure 1:
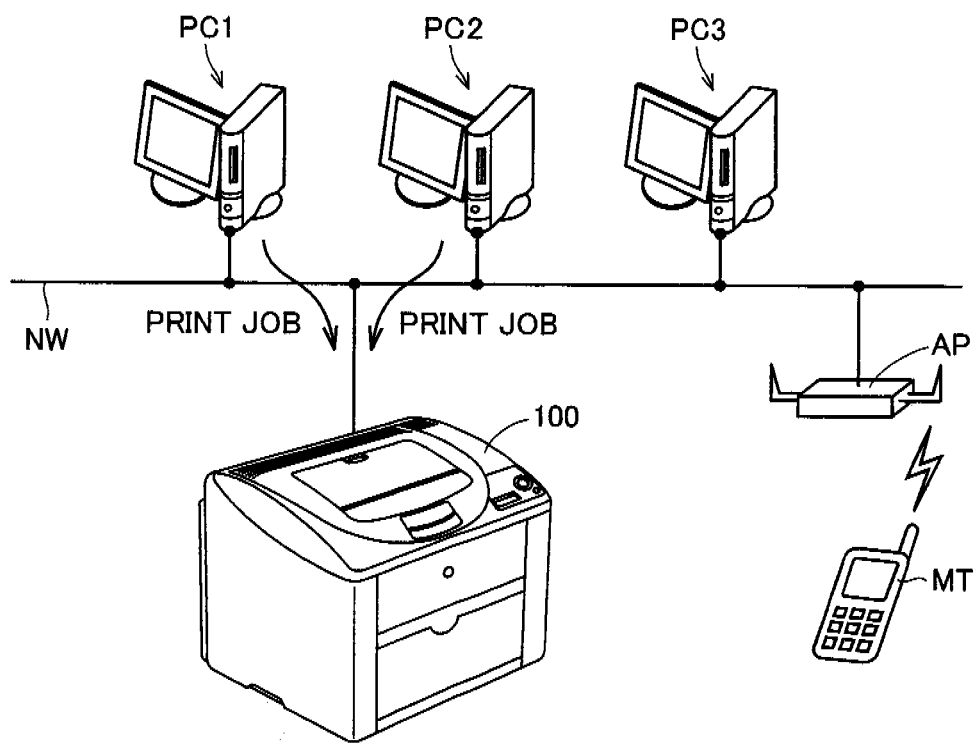
FIG. 1 generally shows a configuration of an image formation system in an embodiment of the present invention.

With reference to FIG. 1, the present invention in an embodiment provides an image formation system SYS including an image formation apparatus 100 and a plurality of information processing devices connected via a network NW to image formation apparatus 100 to be capable of communicating data therewith.

Image formation apparatus 100 may be any type of apparatus that at least has a print engine mounted therein and is capable of the printing process. Typically, image formation apparatus 100 includes a printer, a copying machine, a facsimile, a multi function peripheral (MFP), and the like. In the following description, image formation apparatus 100 is applied to a printer as a typical example for the sake of illustration.

The information processing devices are implemented, with reference to FIG. 1, as personal computers PC1-PC3 (hereinafter also collectively referred to as "personal computer PC") and a mobile terminal MT as a typical example for the sake of illustration. Note that mobile terminal MT is connected to image formation apparatus 100 to be capable of communicating data therewith through wireless communication with an access point AP connected to network NW. Alternatively, as is a mobile phone, mobile terminal MT may be connected to image formation apparatus 100 through a public wireless service to be capable of communicating data therewith. Note that in the present embodiment the information processing device may be of any type that can generate a print job processable by image formation apparatus 100 and transmit the generated print job to image formation apparatus 100. Accordingly in the present embodiment the information processing device can include personal computer PC and/or mobile terminal MT exemplified in FIG. 1, and in addition thereto a workstation, a personal digital assistant (PDA), a network scanner, a network facsimile, and the like. To simplify the following description, the information processing device is implemented as personal computer PC as a typical example for the sake of illustration.

Outline of Process by Image Formation System

In the present embodiment image formation system SYS may allow a word processing application and/or a spreadsheet application to run on personal computer PC. When a user issues a print instruction a print driver installed in personal computer PC generates a print job based on various types of documents formed on these applications. Furthermore, the print driver transmits the generated print job to image formation apparatus 100. In doing so, as will be described hereinafter, the print driver provides an interface allowing the user to select an immediate print mode, which corresponds to a first mode, and a queue and hold mode, which corresponds to a second mode. The user designates one of the modes depending on the level in significance of the document to be printed. In response to the user designating a mode, the print driver sets the designated mode for the generated print job. Note that the print driver also sets as the print job's attributes various settings, such as resolution, orientation, black and white/color, and the like, that are involved in printing.

The immediate print mode is for requesting that a print job be immediately executed independently of another print job. More specifically, when image formation apparatus 100 receives print jobs with the immediate print mode set, image formation apparatus 100, similarly as done by a typical image formation apparatus, performs a printing process for each print job in an order in which the print jobs are received, and image formation apparatus 100 outputs printed matters.

The queue and hold mode is for requesting holding back the printing process until a predetermined condition is satisfied. The queue and hold mode is involved in reducing power consumption, and is an attribute for queuing and holding such print jobs that their owners do not hurry to receive their printed matters in image formation apparatus 100 until the predetermined condition is satisfied, and collectively subjecting the queued and held print jobs to the printing process after the predetermined condition is satisfied. More specifically, when image formation apparatus 100 receives print jobs with the queue and hold mode set, image formation apparatus 100 queues and holds these print jobs and also determines, as occasion requires, whether the predetermined condition is satisfied, and when image formation apparatus 100 determines that the predetermined condition is satisfied image formation apparatus 100 starts the printing process. Note that the predetermined condition includes the following:

(1) the warm up operation is completed (typically, immediately after a print job with the immediate print mode set is executed);

(2) image formation apparatus 100 has more than a predetermined number of print jobs queued and held therein; and (3) a predetermined period of time has elapsed since image formation apparatus 100 started to queue and hold print jobs with the queue and hold mode set.

Thus collectively processing a plurality of print jobs allows the warm up operation to be performed less frequently and can also contribute to an increased sleep time. Image formation apparatus 100 can thus achieve reduced power consumption. In particular, in view of reducing power consumption, it is most efficient that processing print jobs with the immediate print mode set for printing is followed by processing print jobs with the queue and hold mode set for printing.

In other words, the present embodiment provides image formation system SYS to allow print jobs higher in significance to be immediately processed and print jobs lower in significance to be collectively processed to achieve reduced power consumption and also avoid impairing convenience for users who desire to quickly receive their printed matters.

In the present embodiment, when image formation apparatus 100 receives from personal computer PC or a similar information processing device a print job with the immediate print mode set, then, before image formation apparatus 100 executes that print job (or performs the printing process/processes the print job for printing), image formation apparatus 100 determines based on a required consumable item's status whether the print job of interest can successfully be processed for printing. Only when image formation apparatus 100 so determines, image formation apparatus 100 starts to process the print job for printing. If image formation apparatus 100 determines that the print job cannot successfully be processed for printing, image formation apparatus 100 notifies the user associated with that print job that:

(1) the print job of interest cannot be processed for printing; and (2) it is necessary to resupply/replace a consumable item required to process the print job of interest for printing.

Note that the consumable item typically includes sheets, ink, a toner cartridge, an intermediate belt, a fuser and fixer, and the like.

The user associated with the print job includes the owner of the print job (typically, the user having requested the print job), a user having requested another print job also currently queued and held in image formation apparatus 100, an administrator of image formation apparatus 100, and the like. More specifically, image formation apparatus 100 identifies as the print job's owner a user of an information processing device that is a source of the print job. Alternatively, image formation apparatus 100 may identify the owner of the print job of interest and accordingly issue notification to a destination, e.g., a particular mobile terminal MT, previously registered for the corresponding owner.

As a user receiving such notification has designated the immediate print mode and issued a print instruction, it can be expected that image formation apparatus 100 will be handled, as required. More specifically, if the user desires that image formation apparatus 100 previously designated continue the printing process, it is expected that a necessary consumable item will be resupplied and/or replaced. For example, if image formation apparatus 100 has run out of sheets, a user having received such notification resupplies image formation apparatus 100 with sheets to continue to execute a print job that he/she has requested.

In the present embodiment image formation apparatus 100 displays an input button or the like on a user interface for issuing such notification as described above to cancel the print job of interest. A user who does not desire that image formation apparatus 100 that cannot appropriately process the print job for printing continues to do so presses the input button to cancel a previously requested print job. For example, if an alternative image formation apparatus is available, the user can cause the alternative image formation apparatus to execute a required print job.

Configuration of Image Formation Apparatus

Figure 2:
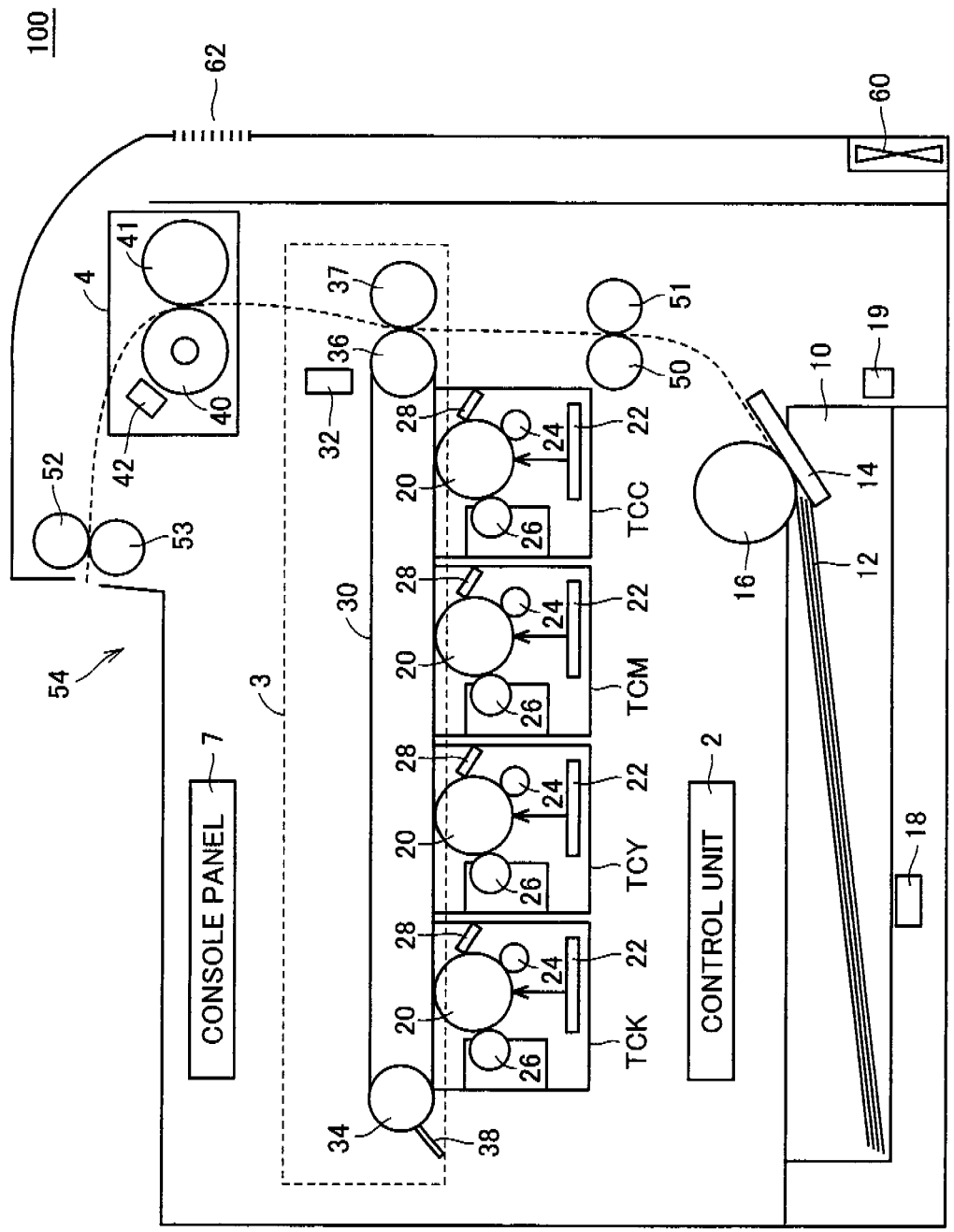
FIG. 2 generally shows a configuration in cross section of an image formation apparatus in the embodiment of the present invention.

FIG. 2 generally shows a configuration in cross section of image formation apparatus 100 in the embodiment of the present invention. FIG. 2 exemplarily shows a tandem image formation apparatus 100 capable of color printing as a typical example of the present image formation apparatus.

With reference to FIG. 2, image formation apparatus 100 includes a control unit 2, toner cartridge units TCC, TCM, TCY, TCK, an intermediate belt unit 3, and a fuser and fixer unit 4.

Control unit 2 generally controls image formation apparatus 100, as will be described hereinafter.

Toner cartridge units TCC, TCM, TCY, TCK, intermediate belt unit 3, and fuser and fixer unit 4 correspond to an image formation unit for forming an image on a sheet 12 serving as a recording medium.

Toner cartridge units TCC, TCM, TCY, and TCK form images of toner particles of cyan, magenta, yellow, and black, respectively. Hereinafter, toner cartridge units TCC, TCM, TCY, TCK will also collectively be referred to as a "toner cartridge unit TC".

Toner cartridge unit TC each includes a photoreceptor 20 carrying an image of toner particles, a charging unit 24 charging photoreceptor 20, an exposure unit 22 exposing an image pattern to light, a developer unit 26 developing the image pattern as an image of toner particles, and a photoreceptor cleaner 28 removing on photoreceptor 20 toner particles that are not transferred and thus remain.

Intermediate belt unit 3 includes an intermediate transfer belt 30 for overlaying images of toner particles of four colors formed on photoreceptors 20 respectively of toner cartridge units TC on one another to form an image, secondary transfer rollers 36 and 37 for transferring the image of toner particles that is formed on intermediate transfer belt 30 (and has the four colors combined together) onto sheet 12, a density sensor 32 for sensing the density of the image of toner particles on intermediate transfer belt 30, and an intermediate transfer belt cleaner 38 for removing the toner particles that are not transferred from intermediate transfer belt 30 and thus remain thereon.

Fuser and fixer unit 4 fixes the image of toner particles transferred by intermediate belt unit 3 onto sheet 12. More specifically, fuser and fixer unit 4 includes a heating roller 40 heating the image of toner particles on sheet 12, a pressure roller 41 applying pressure to the image of toner particles on sheet 12, and a temperature sensor 42 measuring the temperature of a surface of heating roller 40.

Furthermore, image formation apparatus 100 includes an accommodation unit 10 for accommodating sheets, a carriage guide 14, a sheet feeding roller 16, timing rollers 50 and 51, and discharging rollers 52 and 53. These components correspond to a carrier unit for carrying sheet 12. Accommodation unit 10 is provided at its bottom with an availability sensor 18 for sensing an amount of sheets 12 that remain. Availability sensor 18 is a weight sensor, an infrared sensor and/or the like and senses how many sheets are loaded in accommodation unit 10. Furthermore, an attachment sensor 19 is provided at a surface at which accommodation unit 10 and the main body of image formation apparatus 100 contact each other. Attachment sensor 19 senses whether accommodation unit 10 is loaded (or whether accommodation unit 10 is opened/closed).

Image formation apparatus 100 forms an image in an operation, as will be described hereinafter. Accommodation unit 10 are loaded with sheet 12 which is in turn carried along carriage guide 14 as sheet feeding roller 16 rotates. Sheet 12 is carried along a carriage path, and once sheet 12 has arrived at timing rollers 50 and 51, sheet 12 is stopped temporarily. In parallel with the carriage of sheet 12, each toner cartridge unit TC forms an image of toner particles corresponding to an image pattern to be formed into an image, and intermediate transfer belt 30 operates to overlay thereon the image of toner particles that is formed in each toner cartridge unit TC on one another. In synchronization with the image of toner particles on intermediate transfer belt 30, timing rollers 50 and 51 feed sheet 12 to secondary transfer rollers 36 and 37. Secondary transfer rollers 36 and 37 transfer to sheet 12 the image of toner particles formed on intermediate transfer belt 30. Furthermore, sheet 12 having the image of toner particles transferred thereon is carried to fuser and fixer unit 4 and has the image of toner particles fixed thereon by heating roller 40 and pressure roller 41. Furthermore, sheet 12 having the image of toner particles fixed thereon is discharged by discharging rollers 52 and 53 to a discharging tray 54.

Furthermore, image formation apparatus 100 includes a fan 60 for cooling its interior and an opening 62 for introducing air to cool it.

Furthermore, image formation apparatus 100 includes a console panel 7 corresponding to an input unit for receiving an instruction from a user. Console panel 7 has a button operated by the user to receive the instruction and in addition may have a liquid crystal panel or a similar display for indicating the status or the like of image formation apparatus 100.

Furthermore, image formation apparatus 100 may further be provided with a scanner for reading image data from an original, a facsimile processing unit for facsimile communication, and the like.

Configuration of Control Unit of Image Formation Apparatus

Figure 3:
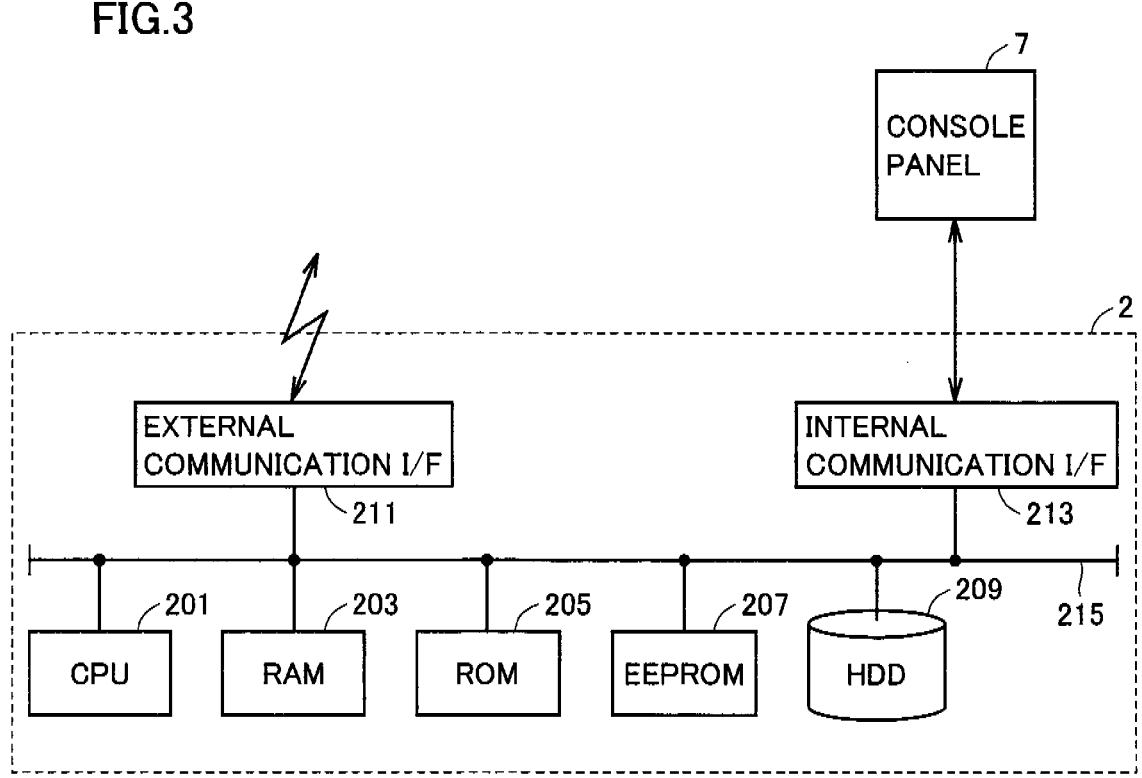
FIG. 3 schematically shows a configuration in hardware of a control unit included in the image formation apparatus in the embodiment of the present invention.

FIG. 3 schematically shows a configuration in hardware of control unit 2 included in image formation apparatus 100 in the embodiment of the present invention.

With reference to FIG. 3, control unit 2 includes a central processing unit (CPU) 201, a random access memory (RAM) 203, a read only memory (ROM) 205, an electrical erasable and programmable read only memory (EEPROM) 207, a hard disk drive (HDD) 209, an external communication interface (I/F) 211, and an internal communication I/F 213. These components are interconnected through an internal bus 215.

In control unit 2, CPU 201 develops in RAM 203 or the like and thus executes a program previously stored in ROM 205 or the like for performing a variety of types of processes to control image formation apparatus 100.

RAM 203 is a volatile memory and used as a working memory. More specifically, RAM 203 stores a program that is executed, and in addition, temporarily stores data of a variety of types of variables. EEPROM 207 is typically a non volatile semiconductor memory and stores image formation apparatus 100's IP address, network domain and other types of set values. HDD 209 is typically a non volatile magnetic memory and stores a print job and the like received from an information processing device.

External communication I/F 211 typically supports a general-purpose communication protocol such as Ethernet and provides data communications on network NW with personal computer PC, another image formation apparatus and the like.

Internal communication I/F 213 is connected to console panel 7 and receives and transmits to CPU 201 a signal corresponding to an operation done by a user on console panel 7, and also operates in accordance with an instruction received from CPU 201 to transmit a signal required for displaying a message or the like on console panel 7.

Configuration of Information Processing Device

Figure 4:
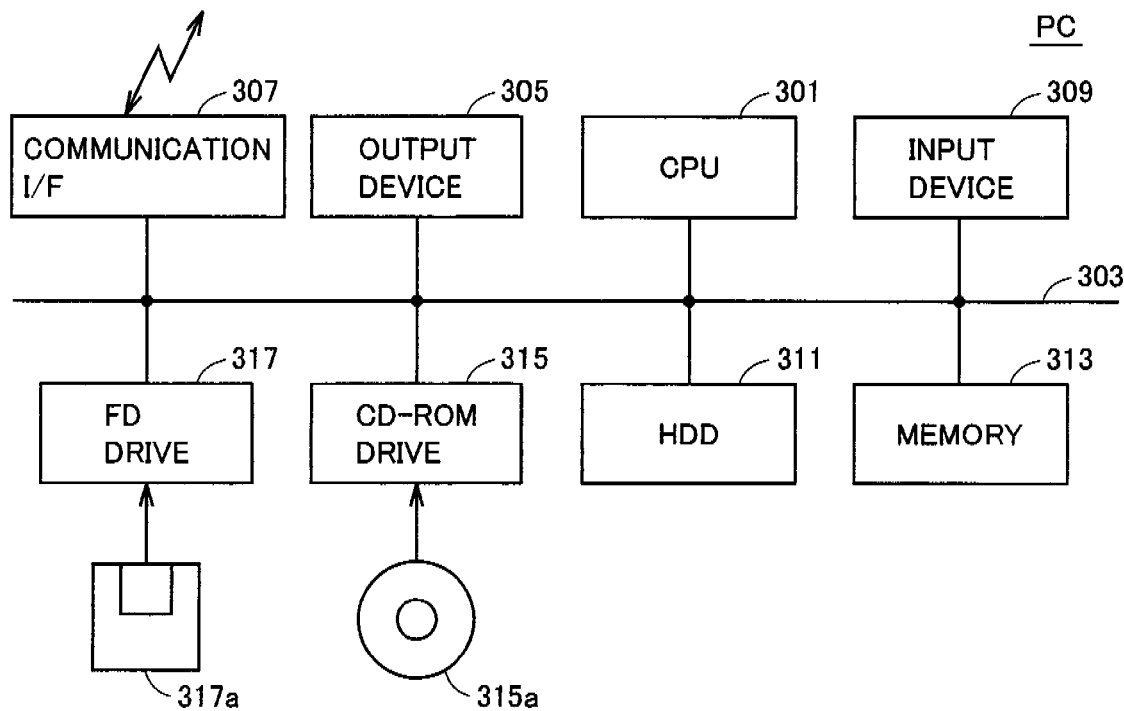
FIG. 4 schematically shows a configuration in hardware of a personal computer implementing a typical example of an information processing device in the embodiment of the present invention.

FIG. 4 schematically shows a configuration in hardware of personal computer PC implementing a typical example of the information processing device in the embodiment of the present invention.

With reference to FIG. 4, personal computer PC as a typical example of the information processing device in the present embodiment includes a CPU 301 executing a variety of types of programs including an operating system, a memory 313 serving as a storage unit for temporarily storing data required for CPU 301 to execute a program, and a hard disk (HDD) 311 for storing in a non-volatile manner the program executed by CPU 301. Such a program is read by a compact disk-read only memory (CD-ROM) drive 315 or a flexible disk (FD) drive 317 from a CD-ROM 315a or a flexible disk 317a, respectively, or a similar, non-transitory computer readable storage medium.

CPU 301 receives a request of an operation from the user through an input device 309 constituted of a keyboard, a mouse, a tablet and/or the like and also outputs to an output device 305 a screen image output generated as a program is executed. Output device 305 is a device provided for displaying a user interface screen and/or a dialog box of an application and/or the print driver to the user. Typically, it is a monitor, a projector and/or the like.

Furthermore, CPU 301 communicates data with image formation apparatus 100 or the like through a communication I/F 307 implemented for example as a LAN card. These components are interconnected through an internal bus 303.

Example of Executing Print Job

Hereinafter, with reference to FIG. 5 to FIG. 13, how in the present embodiment image formation system SYS allows a print job to be executed will be described in one example. To simplify the description, a typical example of a consumable item required for executing a print job is indicated as sheets loaded in accommodation unit 10 (see FIG. 2) of image formation apparatus 100, and how the amount of sheets remaining in image formation apparatus 100 is estimated will be described by way of example.

(1) Single User Requests Print Job with Immediate Print Mode Set

Figure 5:
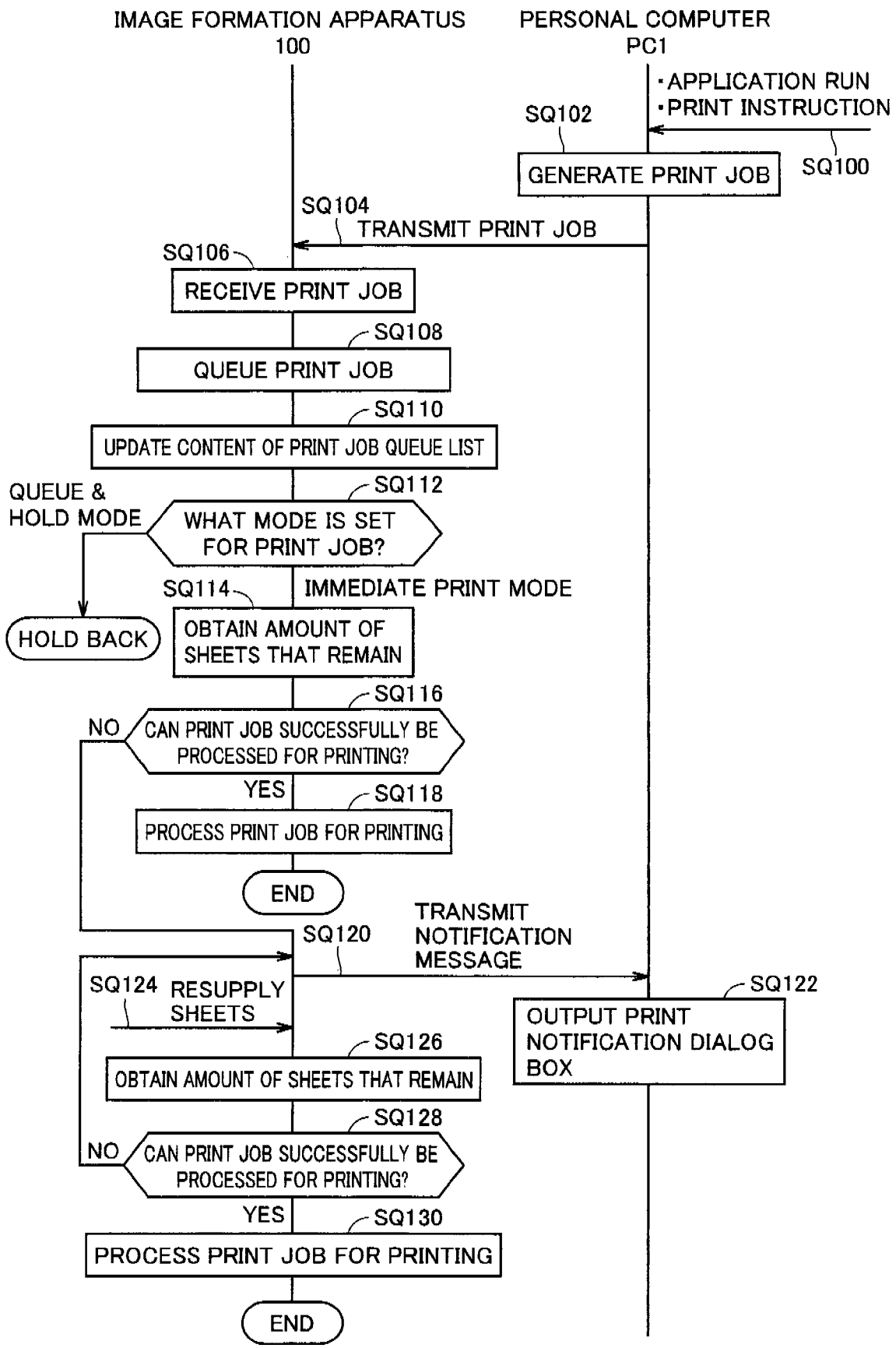
FIGS. 5 and 6 show a diagram of a sequence indicating one example of a procedure of a process performed in the image formation system in the embodiment of the present invention and involved in executing a print job.
Figure 6:
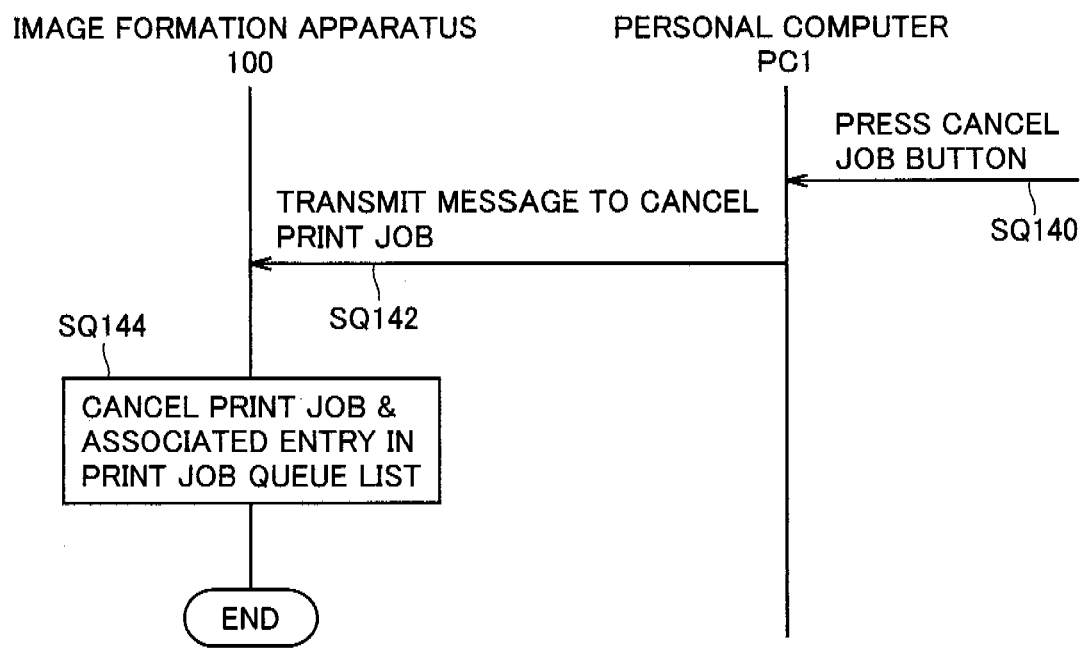

FIGS. 5 and 6 show a diagram of a sequence indicating one example of a procedure of a process performed in image formation system SYS in the embodiment of the present invention and involved in executing a print job. Note that in the FIGS. 5 and 6 sequence diagram a user A has logged in to personal computer PC1 and designates the immediate print mode and issues a print instruction for the sake of illustration.

With reference to FIG. 5, user A initially operates some application on personal computer PC1 to prepare a document, and furthermore, issues a print instruction, for the sake of illustration (sequence SQ100). The print instruction is input on a user interface (a print setup dialog box) provided by a print driver installed in personal computer PC1.

Figure 7:
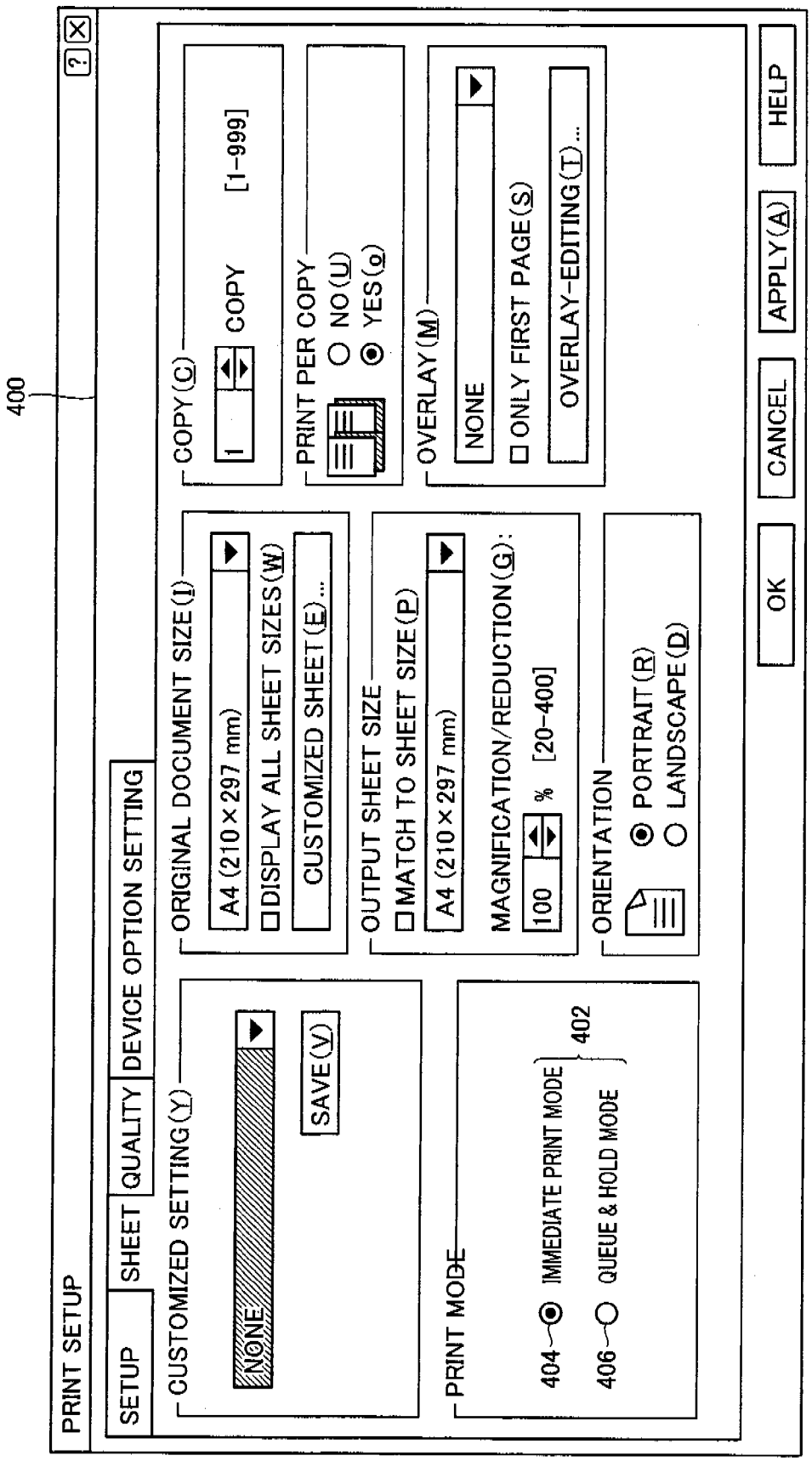
FIG. 7 shows one example of a print setup dialog box displayed on a personal computer in a sequence SQ100 illustrated in FIG. 5.

FIG. 7 shows one example of a print setup dialog box displayed on personal computer PC1 in sequence SQ100 illustrated in FIG. 5. With reference to FIG. 7, a print setup dialog box 400 is provided with an input form receiving a variety of types of settings involved in printing, such as original document size, output sheet size, orientation, the number of sheets printed, and the like, and in addition thereto an input form 402 receiving one of the immediate print mode and the queue and hold mode. In input form 402 a user who desires printing in the immediate print mode selects a radio button 404 and a user who desires printing in the queue and hold mode selects a radio button 406.

With reference again to FIG. 5, the print instruction is responded by personal computer PC1 to generate a print job from the document of interest (sequence SQ102). More specifically, personal computer PC1 outputs page description language (PDL) data describing information for forming an image of the document of interest or raster data representing an image of the document of interest and also adds to these data an attribute following a setting input by the user for printing. This attribute includes either the immediate print mode or the queue and hold mode. Subsequently, personal computer PC1 transmits the generated print job to image formation apparatus 100 (sequence SQ104).

Image formation apparatus 100 receives the print job from personal computer PC1 (sequence SQ106) and queues and holds the print job in a memory device (RAM 203, EEPROM 207, HDD 209 shown in FIG. 2) incorporated therein (sequence SQ108), and furthermore, updates a print job queue list's contents (sequence SQ110). If the received print job is described in PDL, it is preferable that the print job undergo raster conversion to generate raster (bit map) data suitable for forming an image and the generated raster data be stored.

Figures 8, 9:
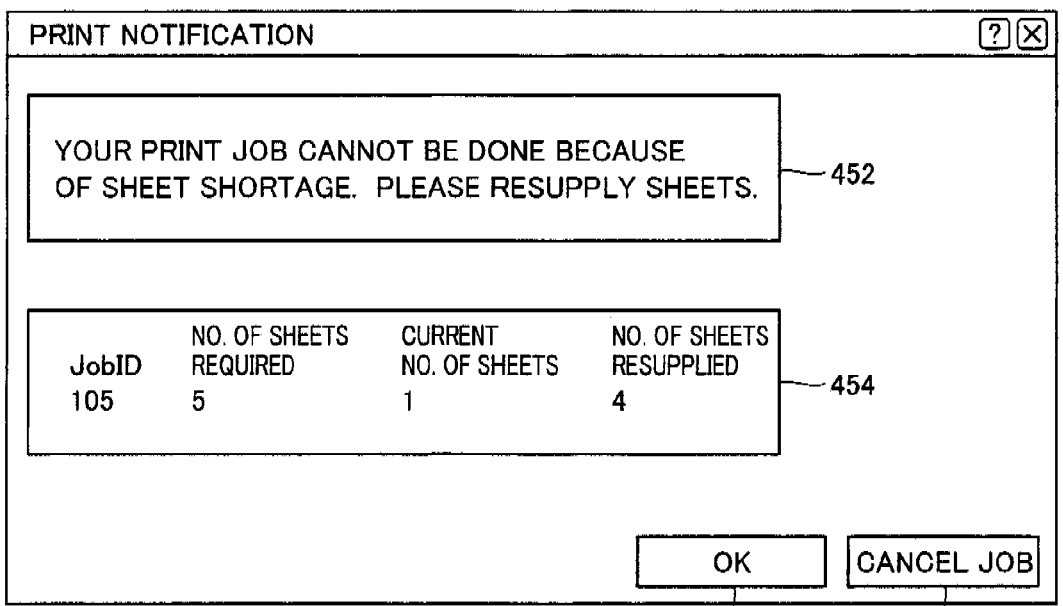
FIG. 8 shows one example of a print job queue list of the image formation apparatus in the embodiment of the present invention.
FIG. 9 shows one example of a print notification dialog box displayed on the personal computer in a sequence SQ122 illustrated in FIG. 5.

FIG. 8 shows one example of the print job queue list of image formation apparatus 100 in the embodiment of the present invention. Image formation apparatus 100 having received a print job from personal computer PC1 queues and holds the print job and also updates a print job queue list 204a as shown in FIG. 8. The FIG. 8 print job queue list 204a has rows, in each of which a print job's contents received by image formation apparatus 100 are stored in time series. As has been described previously, when personal computer PC1 transmits a print job with the immediate print mode set, image formation apparatus 100 further adds the print job. Note that user A has a user ID "10" and the added print job is assigned a job ID "105" for the sake of illustration.

Thus in print job queue list 204a a plurality of print jobs are prioritized, and queued and held. Note that in the FIG. 8 print job queue list 204a the order of receiving print jobs is associated with prioritization (i.e., first-in first-out (FIFO)), and in the figure, each print job is higher in priority than those positioned in the list above the print job, More specifically, print job queue list 204a includes a Job ID column 281, a Request Time column 282, a User ID column 283, a Type of Printing column 284, a Requester IP Address column 285, a Color Information column 286, a Number of Pages column 287, and a Job Data column 288.

Job ID column 281 stores an identification number for identifying a print job received by image formation apparatus 100, and is typically assigned a numeral incrementing in accordance with the order of receiving print jobs.

Request Time column 282 stores a time indicating when image formation apparatus 100 received a print job.

User ID column 283 stores an identification number indicating a user who has generated a corresponding print job, i.e., the owner of the print job. Note that it is assumed that a user ID is preset in the print driver installed in each personal computer PC. Alternatively, the user ID may be obtained by the print driver inquiring an operating system (OS) of personal computer PC having the print driver installed therein.

Type of Printing column 284 stores a type of mode set for a corresponding print job, i.e., a value indicating either the immediate print mode or the queue and hold mode.

Requester IP Address column 285 stores a value indicating an IP address serving as one example of a network address for identifying an information processing device that is a source of a corresponding print job.

Color Information column 286 stores a value indicating whether a corresponding print job is printed in black and white or in color.

Number of Pages column 287 stores the number of pages included in a corresponding print job, i.e., the number of sheets consumed as the corresponding print job is executed (by simplex printing).

Job Data column 288 stores information indicating a substantial file of a corresponding print job, typically a file name of raster data generated from the corresponding print job.

As shown in FIG. 8, if image formation apparatus 100 has previously received a print job to be queued and held and a predetermined condition has not been satisfied for executing the queued and held print job, print job queue list 204a has the queued and held print job registered therein.

With reference again to FIG. 5, image formation apparatus 100 determines what mode is set for the queued and held print job (sequence SQ112). More specifically, image formation apparatus 100 determines whether the received print job is of the immediate print mode or the queue and hold mode. In the FIG. 5 and FIG. 6 example, it is a print job with the immediate print mode designated ("immediate print mode" in sequence SQ112), and accordingly, image formation apparatus 100 performs a process for a printing operation, as described hereinafter. Note that for a print job with the queue and hold mode designated ("queue and hold mode" in sequence SQ112), image formation apparatus 100 holds back starting the printing operation until a predetermined condition is satisfied.

Image formation apparatus 100 then obtains an amount of sheets remaining in its accommodation unit 10 (sequence SQ114). Furthermore, image formation apparatus 100 determines from the amount whether a print job of interest can successfully be processed for printing (sequence SQ116).

If so (YES in sequence SQ116), image formation apparatus 100 processes the print job of interest for printing (sequence SQ118).

If the print job of interest cannot successfully be processed for printing (NO in sequence SQ116), image formation apparatus 100 transmits a message notifying personal computer PC1 that the print job cannot successfully be processed for printing and that it is necessary to resupply sheets required to process the print job for printing (sequence SQ120). Personal computer PC1 receives the message and outputs a print notification dialog box on output device 305 (sequence SQ122).

FIG. 9 shows one example of a print notification dialog box displayed on personal computer PC1 in sequence SQ122 illustrated in FIG. 5. With reference to FIG. 9, a print notification dialog box 450 displays a message indicating that a print job cannot successfully be processed for printing by indicating "Your print job cannot be done because sheets are running/have run out." and a message urging a user to resupply sheets required to process the print job for printing by indicating "Resupply sheets." in a box 452. Furthermore, print notification dialog box 450 also displays in a box 454 a job ID indicating a print job of interest to be immediately printed, how many sheets are required to successfully process the print job for printing, how many sheets are currently loaded in image formation apparatus 100, how many sheets should be resupplied, and the like. Note that if a consumable item to be managed includes ink, a toner cartridge, an intermediate belt, a fuser and fixer and the like and their lifetimes are monitored for management, then for example a message "Your print job cannot be done because ink is running/has run out. Replace ink cartridge," may be displayed. Alternatively, a message "Your print job cannot be done because toner is running/has run out. Resupply toner." may for example be displayed.

Furthermore, print notification dialog box 450 has an OK button 456 receiving the user's confirmation of what is displayed in print notification dialog box 450, and a Cancel Job button 458 for receiving an instruction indicating that the print job of interest be canceled.

Note that print notification dialog box 450 may be displayed for each print job requested or may display the contents relevant to a plurality of print jobs in a single print notification dialog box 450 in the form of a list. The former is advantageous in that it can draw users' attentions for each print job. The latter allows a plurality of print jobs that a single user has requested to be collectively handled, and can thus enhance the user's operability.

With reference again to FIG. 5, user A sees print notification dialog box 450 and presses OK button 456 (see FIG. 9), and resupplies image formation apparatus 100 with sheets (sequence SQ124). Note that pressing OK button 456 closes print notification dialog box 450.

After a message has been transmitted for displaying such a print notification dialog box as shown in FIG. 9, if image formation apparatus 100 detects that accommodation unit 10 has been opened and closed to resupply sheets, image formation apparatus 100 again obtains the amount of sheets remaining in accommodation unit 10 (sequence SQ126). Subsequently, from the amount obtained, image formation apparatus 100 again determines whether the print job of interest can successfully be processed for printing (sequence SQ128). Note that whether accommodation unit 10 has been opened and closed is determined from a signal received from attachment sensor 19 (see FIG. 2).

If the print job of interest can successfully be processed for printing (YES in sequence SQ128), image formation apparatus 100 processes the print job of interest for printing (sequence SQ130).

If the print job of interest still cannot successfully be processed for printing (NO in sequence SQ128), image formation apparatus 100 transmits a message to personal computer PC1 to again notify personal computer PC1 that the print job cannot successfully be processed for printing and that it is necessary to resupply sheets required to process the print job for printing (sequence SQ120). Then, sequence SQ122 et seq. are repeated.

With reference to FIG. 6, if user A seeing print notification dialog box 450 does not desire that image formation apparatus 100 designated continue the printing process and presses Cancel Job button 458 (see FIG. 9) (sequence SQ140), then personal computer PC1 transmits a message to image formation apparatus 100 to cancel the print job that the personal computer is notified of (sequence SQ142).

Image formation apparatus 100 receives the message from personal computer PC1 to cancel the print job, and cancels the print job queued and held (or raster data generated from the print job) and also cancels an entry in what is registered in print job queue list 204a that corresponds to the print job of interest (sequence SQ144).

(2) A Plurality of Users Request Print Jobs, Respectively, of Immediate Print Mode FIGS. 5 and 6 have illustrated a sequence provided when a single user requests image formation apparatus 100 to process a print job of the immediate print mode. Hereinafter will be described a sequence provided when a plurality of users request print jobs, respectively, with the immediate print mode set, and image formation apparatus 100 cannot executes them.

Figure 10:
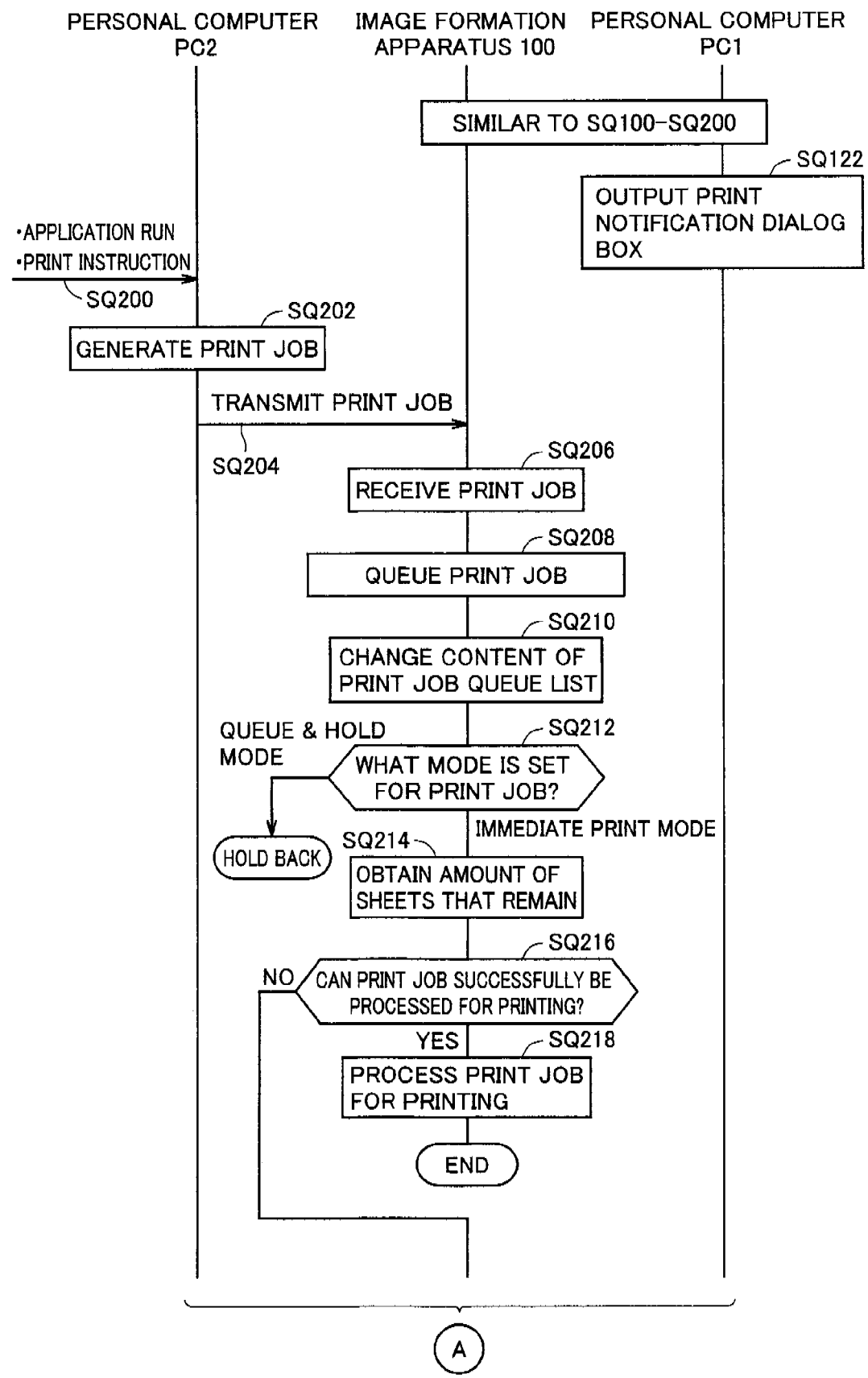
FIGS. 10 and 11 show a diagram of a sequence indicating another example of the procedure of the process performed in the image formation system in the embodiment of the present invention and involved in executing a print job.
Figure 11:
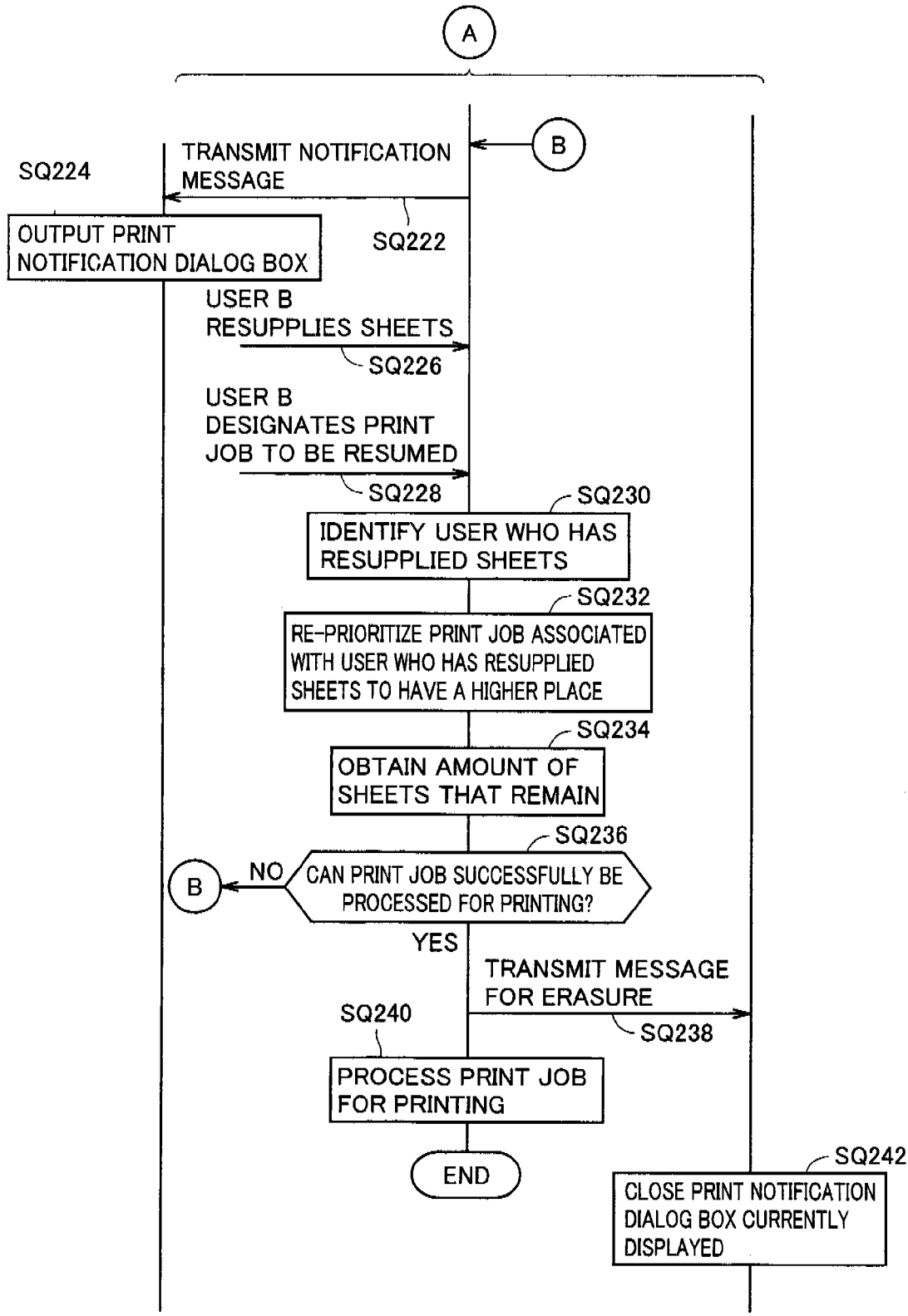

FIGS. 10 and 11 show a diagram of a sequence indicating another example of the procedure of the process performed in image formation system SYS in the embodiment of the present invention and involved in executing a print job. Note that the FIGS. 10 and 11 sequence diagram indicates a case in which in the FIG. 5 sequence diagram after personal computer PC1 outputs the print notification dialog box (sequence SQ122) and before user A takes any action another user B who has logged in to personal computer PC2 designates the immediate print mode and issues a new print instruction.

With reference to FIG. 10, initially, a process similar to the FIG. 5 sequences SQ100-SQ120 is performed for the sake of illustration. In response, personal computer PC1 outputs a print notification dialog box on output device 305 for a print job requested by user A (sequence SQ122).

Herein, before user A takes any action, user B operates some application on personal computer PC2 to prepare a document and furthermore issues a print instruction for the sake of illustration (sequence SQ200). In response to the print instruction, personal computer PC2 generates a print job from the document of interest (sequence SQ202), and transmits the generated print job to image formation apparatus 100 (sequence SQ204).

Image formation apparatus 100 receives from personal computer PC2 the print job requested by user B (sequence SQ206) and queues and holds the print job in a memory device incorporated therein (sequence SQ208), and furthermore, updates the print job queue list's contents (sequence SQ210).

FIGS. 12A and 12B show another example of the print job queue list of image formation apparatus 100 in the embodiment of the present invention. In FIG. 10 at sequence SQ210 when the print job requested by user B is received, print job queue list 204a is updated from what is registered therein as shown in FIG. 8 to that shown in FIG. 12A. More specifically, when image formation apparatus 100 receives a print job from personal computer PC2 with the immediate print mode designated, image formation apparatus 100 adds the print job to the FIG. 8 print job queue list. Note that user B has a user ID "11" and the added print job is assigned a job ID "106" for the sake of illustration.

With reference again to FIG. 10, image formation apparatus 100 determines what mode is set for the queued and held print job (sequence SQ212). More specifically, image formation apparatus 100 determines whether the received print job is of the immediate print mode or the queue and hold mode. In the FIGS. 10 and 11 example, user B requests a print job with the immediate print mode set ("immediate print mode" in sequence SQ212), and accordingly, image formation apparatus 100 performs a process for a printing operation, as indicated in sequence SQ214 et seq. If the print job is a print job with the queue and hold mode set ("queue and hold mode" in sequence SQ212), and it is received from user B, image formation apparatus 100 does not subject the print job to processing for printing, and instead performs sequence SQ222 et seq.

In sequence SQ214, image formation apparatus 100 obtains an amount of sheets remaining in its accommodation unit 10. Then, image formation apparatus 100 determines from the amount whether the print job of interest can successfully be processed for printing (sequence SQ216).

If so (YES in sequence SQ216), image formation apparatus 100 processes the print job of interest for printing (sequence SQ218).

With reference to FIGS. 10 and 11, if the print job of interest cannot successfully be processed for printing (NO in sequence SQ216), image formation apparatus 100 transmits a message to personal computer PC2 to notify it that the print job cannot successfully be processed for printing and that it is necessary to resupply sheets required to process the print job for printing (sequence SQ222). Personal computer PC2 receives the message and outputs a print notification dialog box on output device 305 (sequence SQ224). This print notification dialog box is similar to that of FIG. 9, and accordingly, will not be described repeatedly in detail.

User B sees print notification dialog box 450, and presses OK button 456 (see FIG. 9) and resupplies image formation apparatus 100 with sheets for the sake of illustration (sequence SQ226). Furthermore, user B, in resupplying sheets, designates a print job of those queued and held in image formation apparatus 100 for which a printing process should be resumed (sequence SQ228). More specifically, user B designates on image formation apparatus 100 or the like a print job of those for which the immediate print mode is set and the printing process has not yet been started as the apparatus is running/has run out of sheets, that user B has requested.

Figure 13:
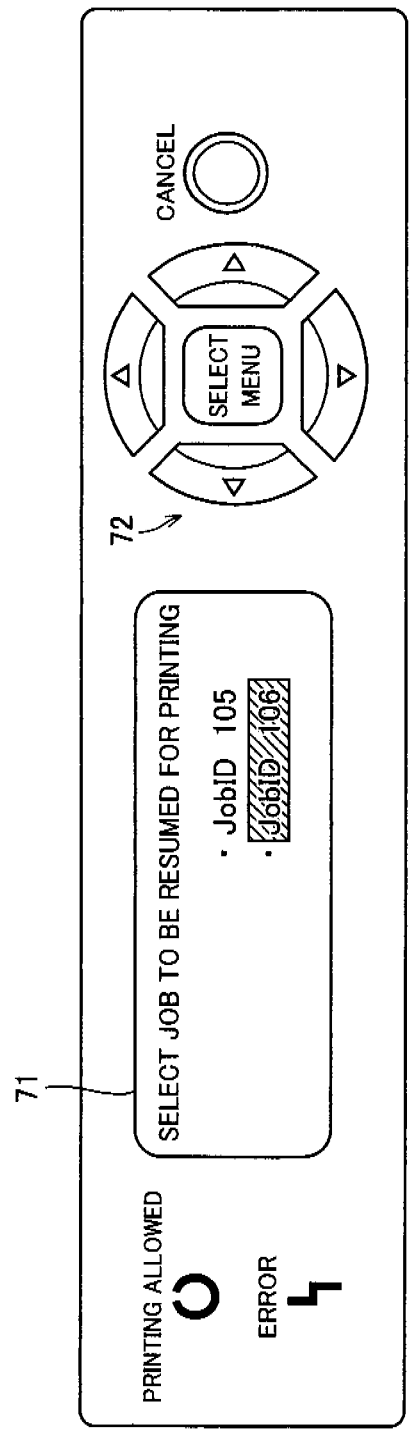
FIG. 13 shows one example of displaying on a console panel of the image formation apparatus in sequence SQ100 illustrated in FIG. 10.

FIG. 13 shows one example of displaying on console panel 7 of image formation apparatus 100 in sequence SQ100 illustrated in FIG. 10. With reference to FIG. 13, console panel 7 has a display 71, which displays a message urging a user to designate a print job for which the printing process should be resumed by indicating "Select job for which printing should be resumed", and also lists print jobs for which the immediate print mode is set and the printing process has not yet been started. The user (in this case, user B) operates an input unit 72 of console panel 7 to select a print job that the user has requested. More specifically, the user operates a direction button to set a cursor that is displayed on display 71 at a print job of interest, and thereafter presses a Select button to select the print job.

With reference again to FIG. 11, a print job to be resumed is designated, and image formation apparatus 100 in response identifies the user who has resupplied sheets in response to the notification that image formation apparatus 100 is running/has run out of sheets (sequence SQ230). More specifically, image formation apparatus 100 refers to print job queue list 204a and therefrom obtains a user ID (a value in User ID column 283) associated with the designated print job or an IP address (a value in Requester IP Address column 285) of a personal computer that is the source of the print job.

Furthermore, in accordance with the information obtained in sequence SQ230, image formation apparatus 100 re-prioritizes a print job of those registered in print job queue list 204a with the immediate print mode set that is associated with the user who has resupplied sheets (in this scenario, user B) to have a higher place (sequence SQ232). Typically, image formation apparatus 100 re-prioritizes a print job with the immediate print mode set that is owned by the user who has resupplied sheets, to have the highest place. In the above example, user B has resupplied sheets, and accordingly, of print jobs registered in the FIG. 12A print job queue list 204a, a print job owned by user B, or having job ID "106", is re-prioritized to have a place higher than a print job owned by user A, or having job ID "105". That is, as priority is thus changed, print job queue list 204a has contents as shown in FIG. 12B.

Note that as shown in FIG. 13, the user who has resupplied sheets operates console panel 7 himself/herself. Alternatively, when the user resupplies sheets, the user may holds an integrated circuit (IC) that has previously been distributed to him/her to a non-contact reading device to authenticate the user.

With reference again to FIG. 11, after a message has been transmitted for displaying such a print notification dialog box as shown in FIG. 9, if image formation apparatus 100 detects that accommodation unit 10 has been opened and closed to resupply sheets, image formation apparatus 100 again obtains the amount of sheets remaining in accommodation unit 10 (sequence SQ234). Subsequently, from the amount obtained, image formation apparatus 100 again determines whether the print job of interest (in this scenario, at least a print job requested by user B) can successfully be processed for printing (sequence SQ236). Note that whether accommodation unit 10 has been opened and closed is determined from a signal received from attachment sensor 19 (see FIG. 2).

If the print job of interest can successfully be processed for printing (YES in sequence SQ236), image formation apparatus 100 transmits a message to personal computer PC1 to close the print notification dialog box output on output device 305 of personal computer PC1 (sequence SQ238), and image formation apparatus 100 processes the print job of interest for printing (sequence SQ240), Personal computer PC 1 receives the message and in response closes the displayed print notification dialog box (sequence SQ242). In other words, after image formation apparatus 100 has notified personal computer PC1, when a decision once having been made on whether a print job with the immediate print mode set can successfully be processed for printing is changed, image formation apparatus 100 updates the notification's contents that personal computer PC1 has previously been notified of. Note that when a print job with the immediate print mode set can successfully be processed for printing, not only is a print notification dialog box currently displayed by personal computer PC closed, but the information indicated in the print notification dialog box may also be updated when the number of sheets resupplied to accommodation unit 10, the condition of another print job with the immediate print mode set, and/or the like have/has changed.

With reference to FIG. 10 and FIG. 11, if the print job of interest still cannot successfully be processed for printing (NO in sequence SQ236), image formation apparatus 100 transmits a message to personal computer PC2 to notify it that the print job cannot successfully be processed for printing and that it is necessary to resupply sheets required to process the print job for printing (sequence SQ222). Then, sequence SQ224 et seq. are repeated.

If user B, seeing print notification dialog box 450, does not desire that image formation apparatus 100 designated continue the printing process, user B can press Cancel Job button 458 (see FIG. 9) to perform a sequence similar to that shown in FIG. 6. As a result, image formation apparatus 100 cancels the print job requested by user B (or raster data generated from the print job) and also cancels an entry in what is registered in print job queue list 204a that corresponds to the print job of interest.

Control Structure of Image Formation Apparatus

Figure 14:
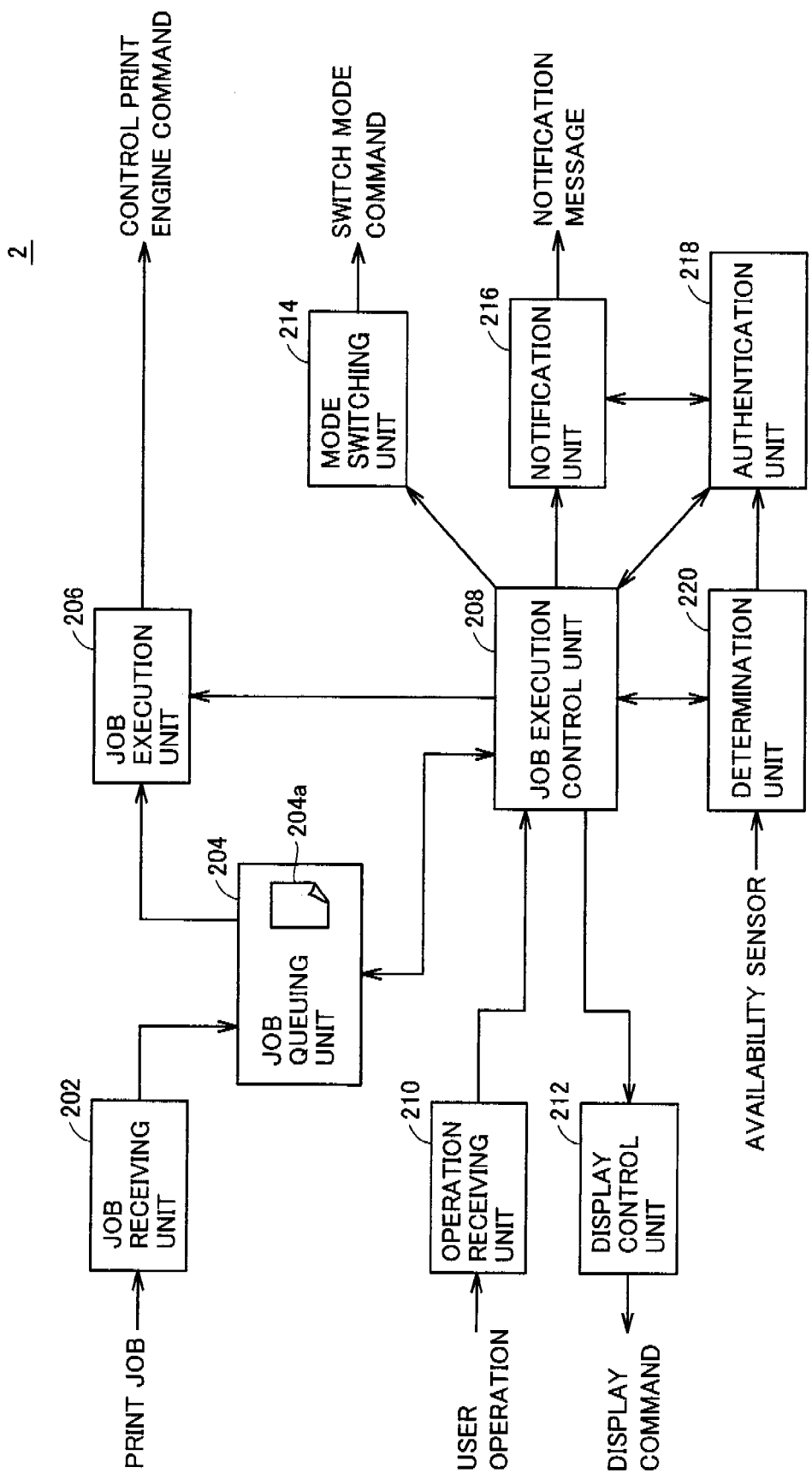
FIG. 14 is a block diagram of a control structure of the image formation apparatus in the embodiment of the present invention.
Figure 15:
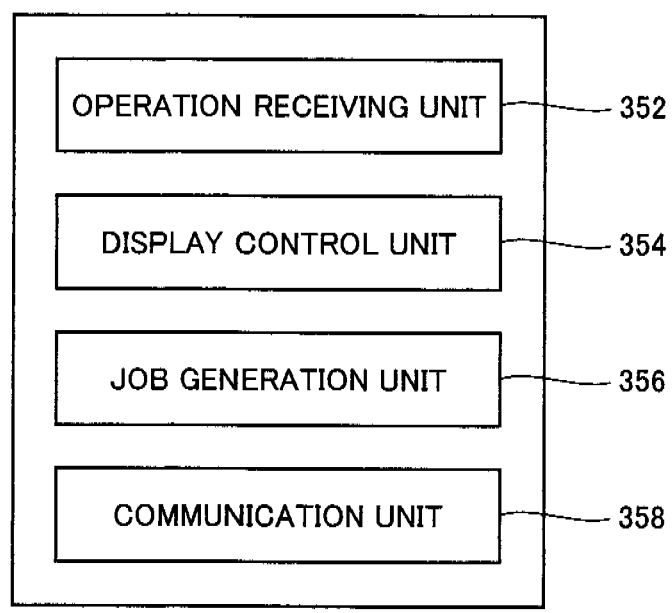
FIG. 15 is a block diagram of a control structure of the personal computer in the embodiment of the present invention.

FIG. 14 is a block diagram of a control structure of image formation apparatus 100 in the embodiment of the present invention. FIG. 15 is a block diagram of a control structure of personal computer PC in the embodiment of the present invention.

With reference to FIG. 14, image formation apparatus 100 includes as its control structure a job receiving unit 202, a job queuing unit 204, a job execution unit 206, a job execution control unit 208, an operation receiving unit 210, a display control unit 212, a mode switching unit 214, a notification unit 216, an authentication unit 218, and a determination unit 220. Job queuing unit 204 is provided as a predetermined area included in RAM 203, EEPROM 207, HDD 209 (see FIG. 3). Furthermore, job receiving unit 202 and notification unit 216 are provided by external communication I/F 211, and CPU 201 executing associated driver software. The other components are provided typically by CPU 201 (see FIG. 3) developing a program in RAM 203 (see FIG. 3) and executing each command.

Job receiving unit 202 receives a print job transmitted from personal computer PC or a similar information processing device. Job receiving unit 202 passes the received print job to job queuing unit 204. Note that job receiving unit 202 may have a function performing raster conversion.

Job queuing unit 204 receives the print job (or raster data obtained from the print job through raster conversion) from job receiving unit 202 and queues and holds it. Furthermore, job queuing unit 204 has print job queue list 204a, and as it queues the print job, job queuing unit 204 updates the list's contents, as occasion demands. Note that when job execution unit 206, which will be described hereinafter, performs a printing process for any queued and held print job, job queuing unit 204 cancels the print job and updates what is registered in print job queue list 204a.

Job execution unit 206 receives a control instruction from job execution control unit 208, reads in accordance therewith a designated print job among print jobs queued and held in job queuing unit 204, and outputs to the print engine a control command based on the read print job. This control command includes information for forming an image of toner particles of each color, a size of a sheet used for printing, and the like.

Job execution control unit 208 controls a printing process performed for print jobs queued and held in job queuing unit 204. More specifically, when job queuing unit 204 receives, and queues and holds a new print job, job execution control unit 208 determines what mode is set for the print job and therefrom also determines whether the printing process should be started. If job execution control unit 208 determines that the printing process should be started, job execution control unit 208 inquires determination unit 220 of whether the printing process can be performed, and if the printing process can successfully be performed, the printing process is started. If the printing process cannot successfully be performed for the print job, job execution control unit 208 issues a control instruction to notification unit 216 to notify a user associated with that print job. Furthermore, after job execution control unit 208 has issued notification indicating that the printing process cannot be performed, when any user resupplies or replaces a consumable item, job execution control unit 208 issues a control instruction to job queuing unit 204 in accordance with which user is identified in authentication unit 218 to re-prioritize print jobs in print job queue list 204a.

Operation receiving unit 210 receives a user's operation and provides its content(s) to job execution control unit 208. Typically, operation receiving unit 210 provides to job execution control unit 208 a signal corresponding to an operation done by the user operating input unit 72 of console panel 7 (see FIG. 13). Display control unit 212 displays information or the like that a user should be notified of. Typically, display control unit 212 causes the console panel 7 display 71 (see FIG. 13) to display a message corresponding to a situation. While in the above embodiment console panel 7 attached to image formation apparatus 100 displays various types of information or a user provides operations on console panel 7, a similar function may be provided as an interface on a screen of personal computer PC networked.

Mode switching unit 214 follows a decision made in job execution control unit 208 to switch a power mode of image formation apparatus 100. Typically, image formation apparatus 100 has a normal mode allowing a normal printing process and a power saving mode reducing power consumption, and the power saving mode includes a low power mode that can recover in a short period of time in response to a request for a printing process and a sleep mode maximally cutting electric power consumption. When a period of time elapses with no print job to be processed for printing, mode switching unit 214 issues a mode switching command to the print engine to switch from the normal mode to the low power mode and then to the sleep mode, depending on how much time elapses for the period of time, to switch a power mode of image formation apparatus 100.

When determination unit 220 determines that the print job of interest cannot successfully be processed for printing, notification unit 216 notifies an information processing device that is a source of that print job that the print job cannot successfully be processed for printing and that it is necessary to resupply/replace a consumable item required to process the print job for printing. Typically, notification unit 216 transmits a notification message, based for example on an IP address recorded in association with the print job of interest, for displaying a print notification dialog box.

After notification is provided indicating that the print job of interest cannot successfully be processed for printing, when the consumable item is resupplied/replaced, authentication unit 218 identifies which user has resupplied/replaced the consumable item. Typically, authentication unit 218 identifies the user from an operation's contents performed by the user on the console panel 7 input unit 72 and received via operation receiving unit 210 and job execution control unit 208. Alternatively when the user resupplies sheets the user may hold an IC that has previously been distributed to him/her to a non-contact reading device to provide information and authentication unit 218 may identify the user from the information.

Determination unit 220 determines whether a print job of those queued and held in job queuing unit 204, with the immediate print mode set, can successfully be processed for printing. This decision is made based on the status of a consumable item required to process the print job for printing. Typically, determination unit 220 receives a signal from availability sensor 18 and therefrom obtains how many sheets are accommodated in accommodation unit 10, and compares the obtained number of sheets with the number of sheets required to print the print job of interest to determine whether the print job of interest can successfully be processed for printing.

Note that how many sheets are accommodated in accommodation unit 10 may not be obtained through availability sensor 18, and it may instead be obtained through a loading mechanism including an exporting roller. The loading mechanism loads accommodation unit 10 with sheets as a sheet carriage roller rotates. Accordingly, how many sheets are accommodated in accommodation unit 10 can accurately be calculated from how many times the sheet carriage roller rotates.

Note that while the above embodiment exemplifies image formation apparatus 100 and personal computer PC connected directly on network NW, a print server may be provided therebetween to manage a print job. In that case, the print server may provide the FIG. 14 functional block partially or entirely.

With reference to FIG. 15, personal computer PC each includes as its control structure an operation receiving unit 352, a display control unit 354, a job generation unit 356, and a communication unit 358. Operation receiving unit 352 is provided by input device 309 (see FIG. 4) and CPU 301 executing associated driver software. Display control unit 354 is provided by output device 305 (see FIG. 4) and CPU 301 executing associated driver software. Job generation unit 356 is provided typically by CPU 301 (see FIG. 4) developing a program in memory 313 (see FIG. 4) and executing each command.

Operation receiving unit 352 receives an operation performed on personal computer PC by a user and provides the operation's contents to display control unit 354, job generation unit 356 and the like.

Display control unit 354 generates an output of a screen of an application run on personal computer PC, displays a print setup dialog box, responds to a message that is received from image formation apparatus 100 by displaying a print notification dialog box.

Job generation unit 356 operates in response to a print instruction received from a user to generate a print job for example from a document of interest. In doing so, job generation unit 356 provides the immediate print mode or the queue and hold mode, as designated by the user.

Communication unit 358 receives the print job generated by job generation unit 356 and transmits the print job to image formation apparatus 100, and receives a message from image formation apparatus 100 and passes the message for example to display control unit 354.

Note that the print driver may have such a function that a dummy print job excluding valid print data is transmitted to image formation apparatus 100 to previously provide notification indicating whether image formation apparatus 100 having received the dummy print job can successfully perform a printing process.

Procedure of Process in Image Formation Apparatus

Figure 16:
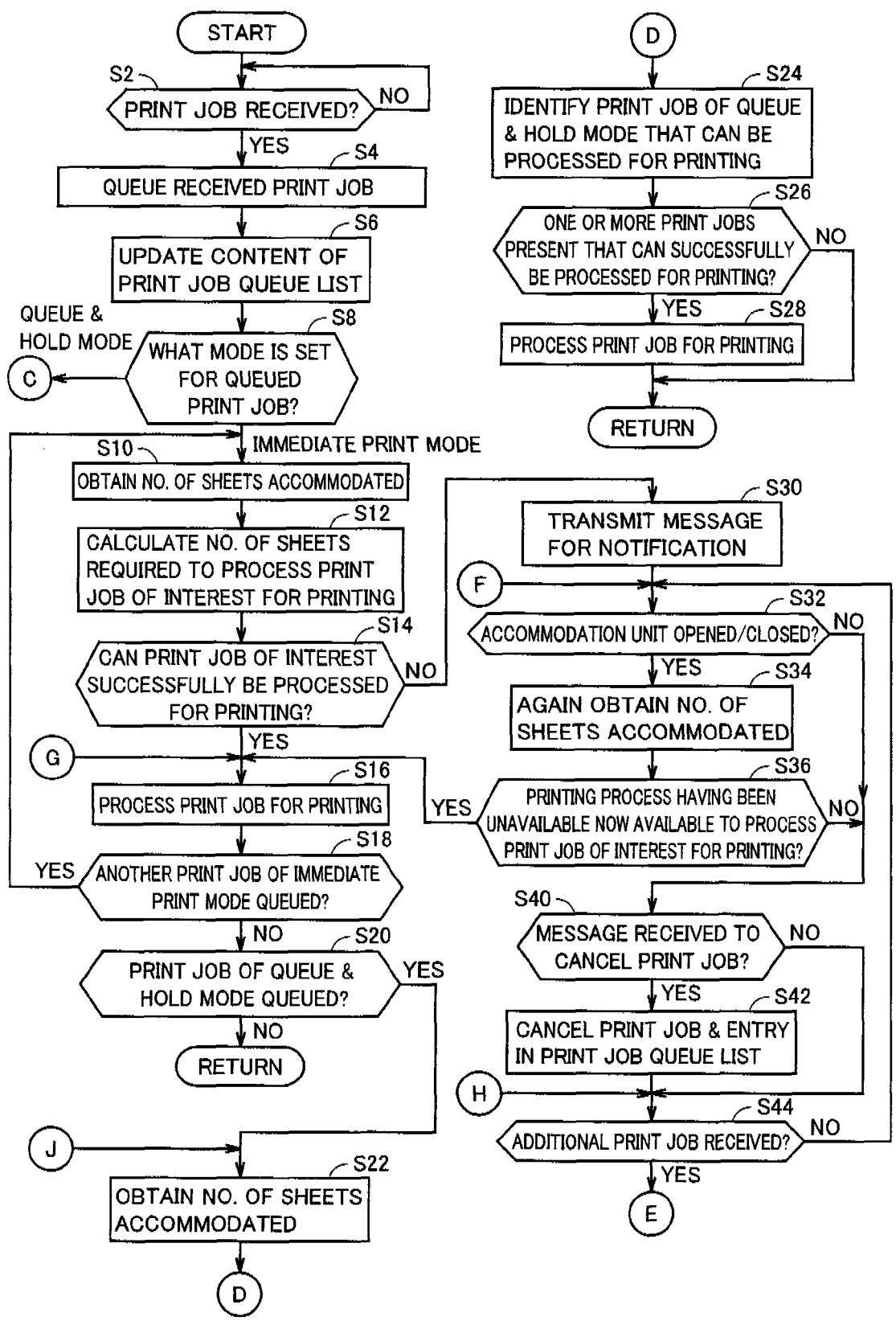
FIGS. 16 and 17 show a flowchart illustrating a procedure of a process performed in the image formation apparatus in the embodiment of the present invention.
Figure 17:
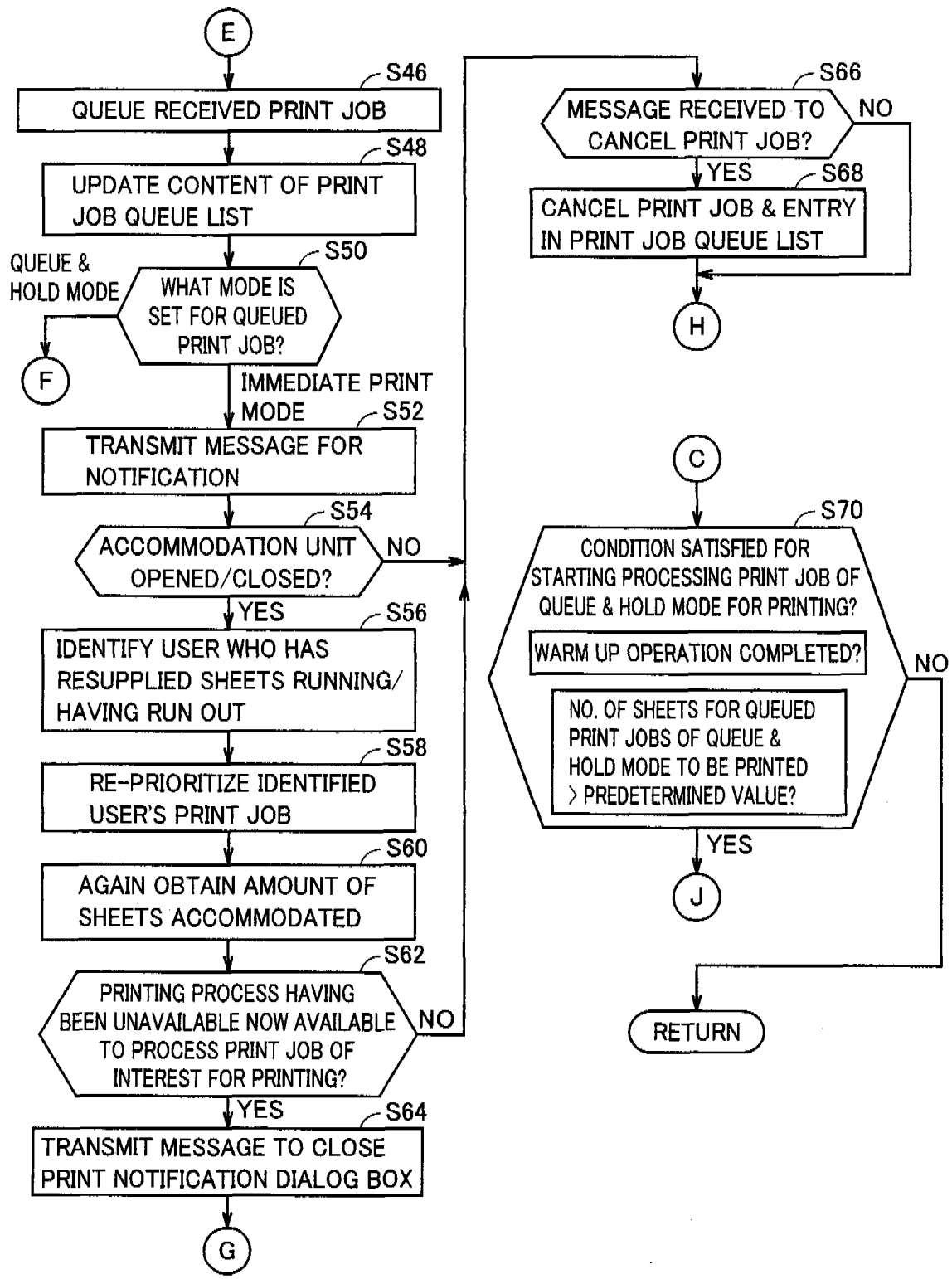

FIGS. 16 and 17 show a flowchart illustrating a procedure of a process performed in image formation apparatus 100 in the embodiment of the present invention. FIG. 16 and FIG. 17 show steps, which are implemented typically by the control unit 2 CPU 201 executing a program, With reference to FIGS. 16 and 17, CPU 201 determines whether there is a print job received from any information processing device (step S2). If not (NO in step S2), step S2 is repeated.

If there is a print job received (YES in step S2), CPU 201 queues the received print job in RAM 203, EEPROM 207, HDD 209 or a similar storage device (step S4). Note that CPU 201 may subject the received print job to raster conversion, as required, and store the generated raster data. Furthermore, CPU 201 updates the contents of print job queue list 204a, as based on the queued print job (step S6).

Subsequently, CPU 201 determines what mode is set for the queued print job (step S8). If the immediate print mode is set for the queued print job ("immediate print mode" in step S8) CPU 201 proceeds to step S10. If the queue and hold mode is set for the queued print job ("queue and hold mode" in step S8) CPU 201 proceeds to step S70.

In step S10, CPU 201 obtains from a signal received from availability sensor 18 how many sheets are accommodated in accommodation unit 10. Furthermore, CPU 201 calculates how many sheets are required to process the print job of interest for printing (step S12). CPU 201 then compares the number of sheets accommodated in accommodation unit 10, as obtained in step S10, with the number of sheets required to process the print job of interest, and determines whether the print job of interest can successfully be processed for printing (step S14). If the print job of interest cannot successfully be processed for printing (NO in step S14) CPU 201 proceeds to step S30.

If the print job of interest can successfully be processed for printing (YES in step S14), CPU 201 processes the print job of interest for printing (step S16). After CPU 201 thus processes the print job, CPU 201 proceeds to step S18.

In step S18, CPU 201 determines whether there is any other print job queued with the immediate print mode set. If so (YES in step S18), step S10 et seq. are repeated.

If there is no other print job queued with the immediate print mode set (NO in step S18), then, CPU 201 determines whether there is any print job queued with the queue and hold mode set (step S20). If there is no print job queued with the queue and hold mode set (NO in step S20), it returns.

If there is a print job queued with the queue and hold mode set (YES in step S20), CPU 201 then obtains from a signal received from availability sensor 18 how many sheets are stored in accommodation unit 10 (step S22). Subsequently, CPU 201 determines which one of print jobs registered in print job queue list 204a with the queue and hold mode set can successfully be processed for printing within a range that does not exceed the number of sheets accommodated in accommodation unit 10, as obtained in step S22 (step S24). Furthermore, CPU 201 determines whether there is one or more print jobs that can successfully be processed for printing (step S26). If not (NO in step S26), it returns.

If there is one or more print jobs that can successfully be processed for printing (YES in step S26), CPU 201 processes the print job that has been determined in step S24 for printing (step S28). After CPU 201 thus processes the print job, CPU 201 returns.

In step S30, CPU 201 transmits to an information processing device logged in to by a user who owns the print job of interest a message notifying the user that the print job of interest cannot successfully be processed for printing and that it is necessary to resupply sheets required to process the print job for printing. Note that CPU 201 identifies an information processing device that is a destination of that message from a value in Requester IP Address column 285 that corresponds to the print job of interest registered in the print job queue list. Subsequently, CPU 201 determines from a signal received from attachment sensor 19 whether accommodation unit 10 has been opened and subsequently closed (step S32). If not (NO in step S32) CPU 201 proceeds to step S40.

If accommodation unit 10 has been opened and subsequently closed (YES in step S32), CPU 201 again obtains from a signal received from availability sensor 18 how many sheets are accommodated in accommodation unit 10 (step S34). Subsequently, CPU 201 compares the number of sheets accommodated in accommodation unit 10, as again obtained in step S34, with the number of sheets required to process the print job of interest for printing, and determines whether the print job of interest can successfully be processed for printing (step S36). If not (NO in step S36) CPU 201 proceeds to step S40, If the print job of interest can successfully be processed for printing (YES in step S36) CPU 201 proceeds to step S16. In other words, CPU 201 processes the print job of interest for printing.

In step S40, CPU 201 determines whether a message has been received to cancel a print job from the information processing device to which CPU 201 has transmitted a message in step S30 for notification. If a message has not been received to cancel a print job (NO in step S40), CPU 201 proceeds to step S44.

If a message has been received to cancel a print job (YES in step S40), CPU 201 cancels a print job corresponding to the message received to cancel the print job and also cancels an entry in what is registered in print job queue list 204a that corresponds to the print job of interest (step S42). CPU 201 then proceeds to step S44.

In step S44, CPU 201 determines whether there is a new print job received from any information processing device. If not (NO in step S44), step S32 et seq. are repeated.

If there is a new print job received (YES in step S44), CPU 201 queues the received new print job in RAM 203, EEPROM 207, HDD 209 or a similar storage device (step S46), and updates the contents of print job queue list 204a, as based on the queued print job (step S48).

Subsequently, CPU 201 determines what mode is set for the queued print job (step S50). If the queue and hold mode is set for the queued print job ("queue and hold mode" in step S50) step S32 et seq. are repeated.

If the immediate print mode is set for the queued and held print job ("immediate print mode" in step S50) CPU 201 transmits to an information processing device logged in to by a user who owns the additionally queued and held print job a message notifying the user that the print job cannot successfully be processed for printing and that it is necessary to resupply sheets required to process the print job for printing (step S52). Subsequently, CPU 201 determines from a signal received from attachment sensor 19 whether accommodation unit 10 has been opened and subsequently closed (step S54). If not (NO in step 554) CPU 201 proceeds to step S66.

If accommodation unit 10 has been opened and subsequently closed (YES in step S54), CPU 201 determines from an operation done on console panel 7 by a user who is the user having resupplied sheets (step S56). Subsequently, CPU 201 updates the contents of print job queue list 204a to re-prioritize a print job of the immediate print mode that is associated with the user identified in step S56 to have a higher place (step S58). Furthermore, CPU 201 again obtains from a signal received from availability sensor 18 how many sheets are accommodated in accommodation unit 10 (step S60). Subsequently, CPU 201 then compares the number of sheets accommodated in accommodation unit 10, as obtained again in step S60, with the number of sheets required to process the print job having the highest priority, and determines whether the print job of interest can successfully be processed for printing (step S62). If not (NO in step S62) CPU 201 proceeds to step S66, If the print job of interest can successfully be processed for printing (YES in step S62), CPU 201 transmits a message to close the print notification dialog box to the information processing device to which a message has been transmitted for notification (step S64). CPU 201 then proceeds to step S16. In other words, CPU 201 processes the print job of interest for printing.

In step S66 CPU 201 determines whether a message has been received to cancel a print job from the information processing device to which CPU 201 has transmitted a message in step S52 for notification. If not (NO in step S66) step S44 et seq. are repeated.

If a message has been received to cancel a print job, (YES in step S66), CPU 201 cancels a print job corresponding to the message received to cancel the print job and also cancels an entry in what is registered in print job queue list 204a that corresponds to the print job of interest (step S68). CPU 201 then repeats step S44 et seq.

In contrast, in step S70, CPU 201 determines whether a condition has been satisfied for starting to process print jobs of the queue and hold mode for printing, as print jobs with the queue and hold mode set are received, and queued and held. More specifically, CPU 201 determines (1) whether at present image formation apparatus 100 has completed a warm up operation, and (2) whether the number of sheets to be printed for print jobs queued with the queue and hold mode set exceeds a predetermined value. If at least one of the conditions is satisfied, CPU 201 determines that a condition has been satisfied for starting to process print jobs of the queue and hold mode for printing. Note that in place of or in addition to these conditions, conditions may be adopted such as (3) whether a predetermined time has arrived, (4) whether queued and held print jobs have attained an amount of data exceeding a predetermined value, (5) whether a storage capacity having print jobs of image formation apparatus 100 stored therein has a value in availability below a predetermined value, and/or the like.

If a condition has been satisfied for starting to process print jobs of the queue and hold mode for printing (YES in step S70) CPU 201 proceeds to step S22. In other words, CPU 201 processes print jobs with the queue and hold mode set for printing.

If a condition has not been satisfied for starting to process print jobs of the queue and hold mode for printing (NO in step S70) it returns.

Function and Effect

According to the embodiment of the present invention, when image formation apparatus 100 receives and queues a print job with the immediate print mode set, then, before the print job is processed for printing, whether the print job can successfully be processed for printing is determined from a status of a consumable item (typically, sheets) required to process the print job for printing. If it is determined that the print job cannot successfully be processed for printing, at least a user who has requested the print job is notified that the print job cannot be processed for printing and that it is necessary to resupply/replace the consumable item required to process the print job for printing. Furthermore, when any user resupplies the consumable item and a printing process is now available to successfully process the print job for printing, processing the print job for printing starts.

This can prevent a printing process that cannot completely be performed for example as a consumable item is running/ has run out. When a print job with the immediate print mode designated and that with the queue and hold mode designated coexist in a single image formation apparatus, a user who desires to quickly receive a printed matter and accordingly has designated the immediate print mode can quickly and unfailingly receive the printed matter.

Furthermore, a user who has issued a print instruction designating the immediate print mode can be notified for example that a consumable item is running/has run out, and the user can thus take an approach corresponding to the situation. Furthermore, the user who has issued the print instruction designating the immediate print mode can more unfailingly be notified for example that the consumable item is running/has run out than a user who has issued a print instruction designating the queue and hold mode.

Furthermore, according to the embodiment of the present invention, personal computer PC notifies a user for example that a consumable item is running/has run out or the like in a print notification dialog box having a cancel button operated to receive an instruction to cancel a print job of interest. When a user operates the cancel button, image formation apparatus 100 has a queued print job of interest canceled therefrom.

This allows a user who desires to quickly receive a printed matter to select resupplying an image formation apparatus that has first received a print job with sheets to cause the image formation apparatus to continue to process the print job for printing, or causing an alternative image formation apparatus to process the same print job for printing.

Furthermore, according to the embodiment of the present invention, notification for example that a consumable item is running/has run out is issued and thereafter when a printing process is now available to successfully process a print job of interest for printing, the previously issued notification has its contents updated, typically, a print notification dialog box is closed. When it is determined that the printing process is unavailable to successfully process the print job for printing and thereafter another user resupplies the image formation apparatus with the consumable item to allow the printing process to be performed to successfully process the print job for printing, users can be informed accordingly. This can for example prevent a plurality of users from leaving their seats to resupply a single image formation apparatus with a consumable item.

Furthermore, according to the embodiment of the present invention, when a plurality of print jobs with the immediate print mode set are queued and held, and in that condition, notification for example that a consumable item is running/has run out is received and in response thereto any user resupplies the consumable item, the user that has resupplied the consumable item has his/her print job re-prioritized to have a higher place. In other words, the user's print job is faster processed for printing.

A user who has quickly handled an image formation apparatus's sheet shortage or the like can quickly obtain a printed matter for a print job that the user has requested, Other Embodiments In the above embodiment a program implements a function, which may partially or entirely be configured by dedicated hardware.

Furthermore in the above embodiment a CPU executes a program, which may be a program module of those provided as a portion of an operating system (OS) of a computer, that is required, called in a predetermined arrangement, as timed as predetermined, to perform a process. In that case, the program per se does not include the above module and cooperates with the OS to perform the process. Accordingly, such a program excluding a module as above can also be included in the program according to the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation system including an image formation apparatus, comprising:
   a receiving unit for receiving a print job generated in accordance with an operation from a user, said print job being generated with one of first and second modes set, said first mode being for requesting immediately forming an image independently of another print job, said second mode being for requesting that forming an image be held back until a predetermined condition is satisfied;
   a queuing unit for queuing the received print job, configured to prioritize a plurality of print jobs and accordingly queue said print jobs;
   a first determination unit for determining what mode is set for the queued print job;
   a second determination unit for determining for the queued print job with said first mode set whether the print job can successfully be processed to form an image based on a status of a consumable item required to form the image;
   a notification unit for notifying, in response to a decision made by said second determination unit that the queued print job cannot successfully be processed to form the image, an information processing device as a source of the queued print job with said first mode set that (a) the queued print job cannot successfully be processed to form the image and (b) it is necessary to resupply/replace said consumable item required to form the image;
   an identification unit for identifying a user who has resupplied/replaced said consumable about which the notification was issued, wherein:
   said queuing unit is further configured such that, after said notification unit has issued the notification, said queuing unit re-prioritizes the print job that is associated with the user who has resupplied/replaced said consumable item to have a higher place; and
   an execution unit for executing, in response to a decision that the queued print job can successfully be processed to form the image, processing the queued print job to form the image.

2. The image formation system according to claim 1, wherein said predetermined condition includes at least one of the following:
   a warm-up operation is completed,
   a predetermined number of print jobs are queued, and
   a predetermined period of time has elapsed since the queued print job was queued.

3. An image formation apparatus comprising:
   a queuing unit for receiving and queuing a print job with one of first and second modes set, said first mode being for requesting immediately forming an image independently of another print job, said second mode being for requesting that forming an image be held back until a predetermined condition is satisfied, wherein said queuing unit is configured to prioritize a plurality of print jobs and accordingly queue said print jobs;
   a first determination unit for determining what mode is set for a queued print job;
   a second determination unit for determining, for a queued print job with said first mode set, whether the print job can successfully be processed to form an image based on a status of a consumable item required to form the image;
   a notification unit for providing notification, in response to a decision made by said second determination unit that the queued print job cannot successfully be processed to form the image, that (a) the queued print job cannot successfully be processed to form the image and (b) it is necessary to resupply/replace said consumable item required to form the image;
   an identification unit for identifying a user who has resupplied/replaced said consumable item indicated in the notification; and
   said queuing unit is further configured such that, after said notification unit has issued the notification, said queuing unit re-prioritizes the queued print job that is associated with the user who has resupplied/replaced said consumable item to have a higher place; and
   an execution unit for executing, in response to a decision that the queued print job can successfully be processed to form the image, processing the queued print job to form the image.

4. The image formation apparatus according to claim 3, wherein said notification unit is configured to provide the notification to a user associated with the queued print job.

5. The image formation apparatus according to claim 3, wherein:
   said notification unit is configured to provide in addition to the notification a user interface for receiving an instruction to cancel the queued print job; and
   said queuing unit is configured such that when the instruction to cancel the queued print job is provided on said user interface said queuing unit cancels a designated print job.

6. The image formation apparatus according to claim 3, wherein said notification unit is configured such that after the notification has been issued when said second determination unit changes its previous decision said notification unit updates what has previously been informed by the notification.

7. The image formation apparatus according to claim 3, further comprising:

an accommodation unit for accommodating sheets on which the image is formed; and an obtaining unit for obtaining how many sheets are accommodated in said accommodation unit, wherein said second determination unit is configured to compare how many sheets are accommodated in said accommodation unit with how many sheets are required to form the image for the queued print job, and therefrom determine whether the queued print job can successfully be processed to form the image.

8. The image formation apparatus according to claim 3, wherein said predetermined condition includes at least one of the following:

a warm-up operation is completed, a predetermined number of print jobs are queued, and a predetermined period of time has elapsed since the queued print job was queued.

9. A method performed in an image formation apparatus for processing, comprising the steps of:

receiving and queuing a print job with one of first and second modes set, said first mode being for requesting immediately forming an image independently of another print job, said second mode being for requesting that forming an image be held back until a predetermined condition is satisfied;

determining what mode is set for the queued print job;

determining for the queued print job with said first mode set whether the print job can successfully be processed to form an image based on a status of a consumable item required to form the image;

when it is determined that the queued print job cannot successfully be processed to form the image, notifying a user who has transmitted the queued print job with said first mode set that (a) the queued print job cannot successfully be processed to form the image and (b) it is necessary to resupply/replace said consumable item required to form the image;

identifying a user who has resupplied/replaced said consumable item indicated in the notification; and after issuing the notification, re-prioritizing the queued print job that is associated with the user who has resupplied/replaced said consumable item to have a higher place; and when it is determined that the queued print job can successfully be processed to form the image, executing processing the queued print job to form the image.

10. The method according to claim 9, wherein said predetermined condition includes at least one of the following:

a warm-up operation is completed, a predetermined number of print jobs are queued, and a predetermined period of time has elapsed since the queued print job was queued.

* * * * *